United States Patent
Takano

(10) Patent No.: US 10,356,768 B2
(45) Date of Patent: *Jul. 16, 2019

(54) COMMUNICATION CONTROL DEVICE, COMMUNICATION CONTROL METHOD, AND TERMINAL DEVICE

(71) Applicant: SONY CORPORATION, Tokyo (JP)

(72) Inventor: Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/921,043

(22) Filed: Mar. 14, 2018

(65) Prior Publication Data

US 2018/0206231 A1    Jul. 19, 2018

Related U.S. Application Data

(63) Continuation of application No. 15/022,139, filed as application No. PCT/JP2014/074004 on Sep. 10, 2014, now Pat. No. 9,949,240.

(30) Foreign Application Priority Data

Nov. 25, 2013 (JP) ................................ 2013-242831

(51) Int. Cl.
*H04W 72/12* (2009.01)
*H04W 72/04* (2009.01)
(Continued)

(52) U.S. Cl.
CPC ......... *H04W 72/0413* (2013.01); *H04L 5/001* (2013.01); *H04L 5/0035* (2013.01);
(Continued)

(58) Field of Classification Search
CPC ... H04L 5/0044; H04L 5/0035; H04L 5/0055; H04W 76/028; H04W 16/32; H04W 72/1284; H04W 84/045
See application file for complete search history.

(56) References Cited

U.S. PATENT DOCUMENTS

2011/0081932 A1* 4/2011 Astely ..................... H04L 5/001
                                                                    455/509
2013/0034018 A1* 2/2013 Wei ................... H04W 72/0453
                                                                    370/254
(Continued)

FOREIGN PATENT DOCUMENTS

JP    2012-005084 A    1/2012
JP    2013-529426 A    7/2013
(Continued)

OTHER PUBLICATIONS

3GPP TSG-RAM (PCell vs, SCell with PUCCH for inter-eNB CA), May 24, 2013.*

(Continued)

*Primary Examiner* — Laleram Jangbahadur
(74) *Attorney, Agent, or Firm* — XSensus LLP

(57) ABSTRACT

To enable a reduction in the effect of backhauling on wireless communications in the case of carrier aggregation, provided herein is a communication control device that acquires information about a terminal device that uses one component carrier of a macro cell as a primary component carrier, sets one or more component carriers of a small cell partially or fully overlapping with the macro cell as an additional component carrier to be used additionally by the terminal device, and sets one component carrier among the one or more component carriers as a special component carrier on which the terminal device is able to transmit uplink control information on an uplink control channel, wherein the uplink control information includes at least one of an acknowledgement (ACK) and a negative acknowledgement (NACK) regarding reception of a downlink signal, an uplink scheduling request, or periodically reported channel state information.

14 Claims, 24 Drawing Sheets

(51) Int. Cl.
| | |
|---|---|
| H04W 16/32 | (2009.01) |
| H04W 84/10 | (2009.01) |
| H04L 5/00 | (2006.01) |
| H04W 76/19 | (2018.01) |
| H04W 76/15 | (2018.01) |
| H04W 84/04 | (2009.01) |

(52) U.S. Cl.
CPC .......... *H04L 5/0055* (2013.01); *H04L 5/0098* (2013.01); *H04W 16/32* (2013.01); *H04W 72/1284* (2013.01); *H04W 76/15* (2018.02); *H04W 76/19* (2018.02); *H04W 84/10* (2013.01); *H04L 5/0044* (2013.01); *H04W 84/045* (2013.01)

(56) References Cited

U.S. PATENT DOCUMENTS

2013/0114568 A1* 5/2013 Sagae .................. H04W 36/30
370/332
2013/0258864 A1 10/2013 Chen et al.

FOREIGN PATENT DOCUMENTS

| WO | WO 2013/005855 A1 | 1/2013 |
|---|---|---|
| WO | WO 2013/015594 A1 | 1/2013 |
| WO | WO 2013/040487 A1 | 3/2013 |

OTHER PUBLICATIONS

Extended European Search Report dated Jun. 6, 2017 in European Patent Application No. 14864457.8.
Singaporean Search Report and Written Opinion dated Jul. 10, 2017 in Singaporean Patent Application No. 11201603836Y.
3GPP TSG-RAN WG2 2 #84, "Special Cell for SeNB with dual Connectivity", InterDigital Communications, Tdoc R2-134398, XP5073479A, Nov. 2013, pp. 1-3.
International Search Report dated Dec. 16, 2014, in PCT/JP2014/074004 Filed Sep. 10, 2014.
"3rd Generation Partnership Project; Technical Specification Group Radio Access Network; Evolved Universal Terrestrial Radio Access (E-UTRA);Radio Resource Control (RRC); Protocol specification," 3GPP TS 36.331 V11.0.0, Jun. 2012 (302 pages).
"PCell vs. SCell with PUCCH for inter-eNB CA," Sharp, 3GPPTSG-RAN WG2#82 R2-132052, May 2013 (6 pages).
3GPP TSG-RAN WG 2#82, May 20, 2013, PCell vs. SCell with PUCCH, pp. 1-6.
"Physical Layer Impact of Dual Connectivity", 3GPP TSG RAN WG1 Meeting #74, R1-133558, Agenda Item 7.2.6.3, Barcelona, Spain, Aug. 19-23, 2013.
"Procedures for Dual Connectivity", 3GPPTSG-RAN#84, R2-134002, Agenda Item 7.2.4, Nov. 11-15, 2013, San Francisco, USA.
"C-plane Procedure for Addition/Removal of SCells in SeNB", 3GPP TSG RAN WG2 Meeting#84, R1-134082, Agenda Item 7.2.2.1, Nov. 11-15, 2013, San Francisco, USA.
Japanese Office Action dated Jul. 3, 2018 in Japanese Application No. 2015-549020.

* cited by examiner

COMMUNICATION CONTROL DEVICE, COMMUNICATION CONTROL METHOD, AND TERMINAL DEVICE

CROSS-REFERENCE TO RELATED APPLICATIONS

The present application is a continuation of U.S. application Ser. No. 15/022,139, filed Mar. 15, 2016, which is a national stage entry of the International Application No. PCT/JP2014/074004, filed Sep. 10, 2014, and is based upon and claims the benefit of priority of Japanese Patent Application No. 2013-242831, filed on Nov. 25, 2013, the contents of each of which are incorporated herein by reference in their entirety.

TECHNICAL FIELD

The present disclosure relates to a communication control device, a communication control method, and a terminal device.

BACKGROUND ART

Currently, 4G wireless communication systems are being standardized by the Third Generation Partnership Project (3GPP). Carrier aggregation is being standardized as a technology of 4G wireless communication systems, for example. Carrier aggregation enables the handling of wider bandwidth by collectively handling two or more component carriers (CCs) having a prescribed bandwidth each.

For example, Non-Patent Literature 1 discloses a procedure for adding or removing a CC to be used by a terminal device in carrier aggregation.

CITATION LIST

Non-Patent Literature

Non-Patent Literature 1: 3GPP TS 36.331 V11.0.0 (2012-06) 3rd Generation Partnership Project; Technical Specification Group Radio Access Network; Evolved Universal Terrestrial Radio Access (E-UTRA); Radio Resource Control (RRC); Protocol specification (Release 11)

SUMMARY OF INVENTION

Technical Problem

A terminal device may use a macro cell CC and a small cell CC for carrier aggregation. In this case, the terminal device uses the CC of the macro cell as a primary component carrier (PCC), and uses the CC of the small cell as a secondary component carrier (SCC), for example. Additionally, an uplink control signal (such as an ACK/NACK, for example) for the SCC (that is, the CC of the small cell) may be transmitted by the PCC (that is, the CC of the macro cell). Furthermore, for example, the uplink control signal may be transmitted from a base station of the macro cell to a base station of the small cell via backhauling.

However, in cases like the above, there is a possibility that the wireless communication of the terminal device may be greatly affected by the backhaul. For example, the uplink control signal (such as an ACK/NACK, for example) may take a large amount of time to reach the base station of the small cell because of a delay on the backhaul. As a result, operation by the base station of the small cell based on the uplink control signal may be delayed, and communication quality for the terminal device may be lowered.

Accordingly, it is desirable to provide a mechanism enabling a reduction in the effect of backhauling on wireless communications in the case of carrier aggregation.

Solution to Problem

According to the present disclosure, there is provided a communication control device including: an acquisition unit configured to acquire information about a terminal device that uses one component carrier of a macro cell as a primary component carrier; and a control unit configured to set one or more component carriers of a small cell partially or fully overlapping with the macro cell as an additional component carrier to be used additionally by the terminal device. The control unit sets one component carrier among the one or more component carriers as a special component carrier on which the terminal device is able to transmit uplink control information on an uplink control channel.

According to the present disclosure, there is provided a communication control method including: acquiring information about a terminal device that uses one component carrier of a macro cell as a primary component carrier; and setting, by a processor, one or more component carriers of a small cell partially or fully overlapping with the macro cell as an additional component carrier to be used additionally by the terminal device. The setting of the one or more component carriers as the additional component carrier includes setting one component carrier among the one or more component carriers as a special component carrier on which the terminal device is able to transmit uplink control information on an uplink control channel.

According to the present disclosure, there is provided a terminal device including: an acquisition unit configured to acquire, when the terminal device uses one component carrier of a macro cell as a primary component carrier, one or more component carriers of a small cell partially or fully overlapping with the macro cell are set as an additional component carrier to be used additionally by the terminal device, and one component carrier among the one or more component carriers is set as a special component carrier on which the terminal device is able to transmit uplink control information on an uplink control channel, information about the one component carrier; and a control unit configured to control wireless communication on the one component carrier so that the uplink control information is transmitted on the uplink control channel of the one component carrier.

Advantageous Effects of Invention

According to the present disclosure as described above, it is possible to reduce the effect of backhauling on wireless communications in the case of carrier aggregation. Note that the above advantageous effect is not strictly limiting, and that any advantageous effect indicated in the present disclosure or another advantageous effect that may be reasoned from the present disclosure may also be exhibited in addition to, or instead of, the above advantageous effect.

DESCRIPTION OF EMBODIMENTS

Figure 1:
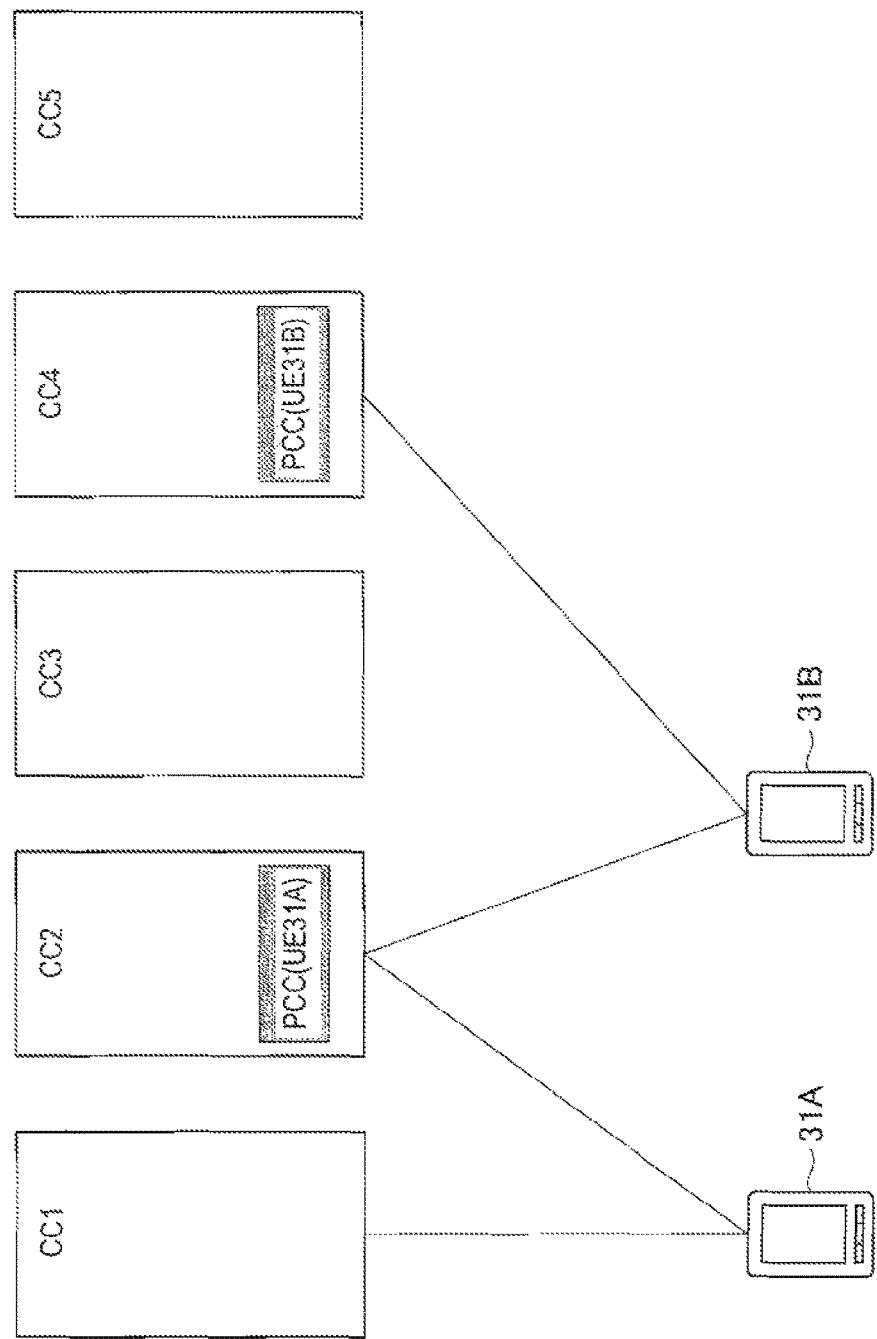
FIG. 1 is an explanatory diagram for illustrating an example of the PCCs of respective UEs.

Hereinafter, preferred embodiments of the present disclosure will be described in detail and with reference to the attached drawings. Note that, in this specification and the appended drawings, structural elements that have substantially the same function and structure are denoted with the same reference numerals, and repeated explanation of these structural elements is omitted.

Hereinafter, the description will proceed in the following order.

1. Introduction
2. Schematic configuration of communication system
3. Configuration of macro base stations
4. Terminal device configuration
5. Process flow
6. Modifications
   6.1. First modification
   6.2. Second modification
7. Applications
   7.1. Application Examples Regarding Base Station
   7.2. Application Examples Regarding Terminal Apparatus
8. Conclusion «1. Introduction»

Figure 2:
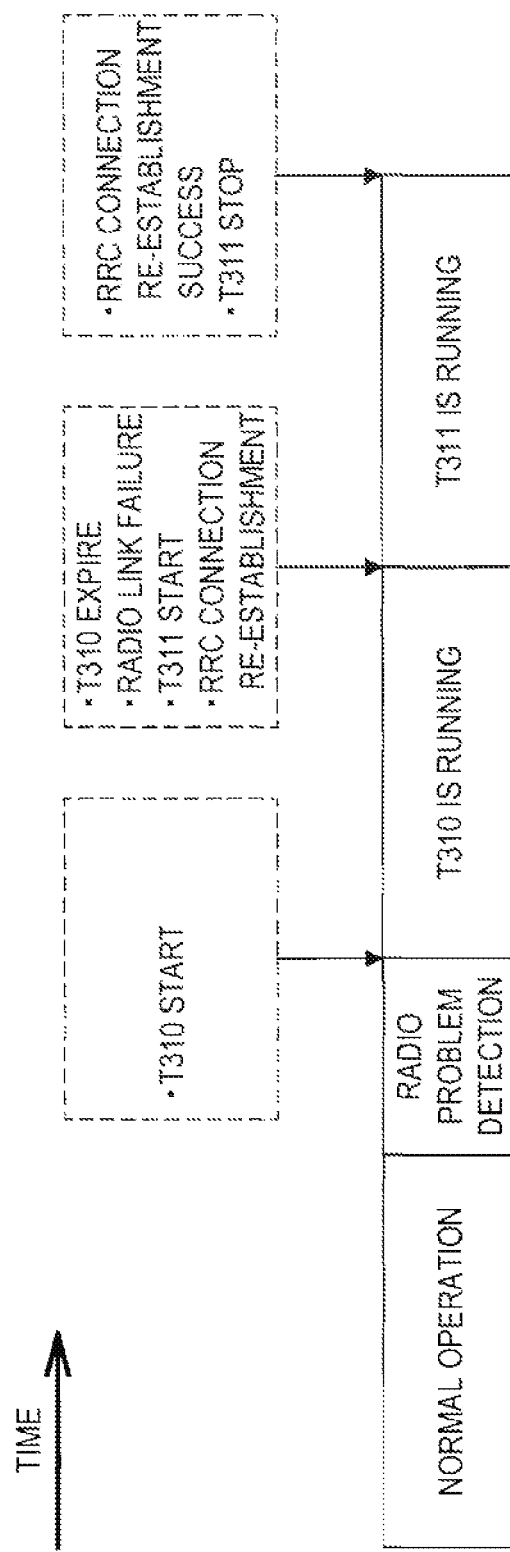
FIG. 2 is a first explanatory diagram for illustrating an example of a procedure after the detection of a radio link failure (RLF).
Figure 3:
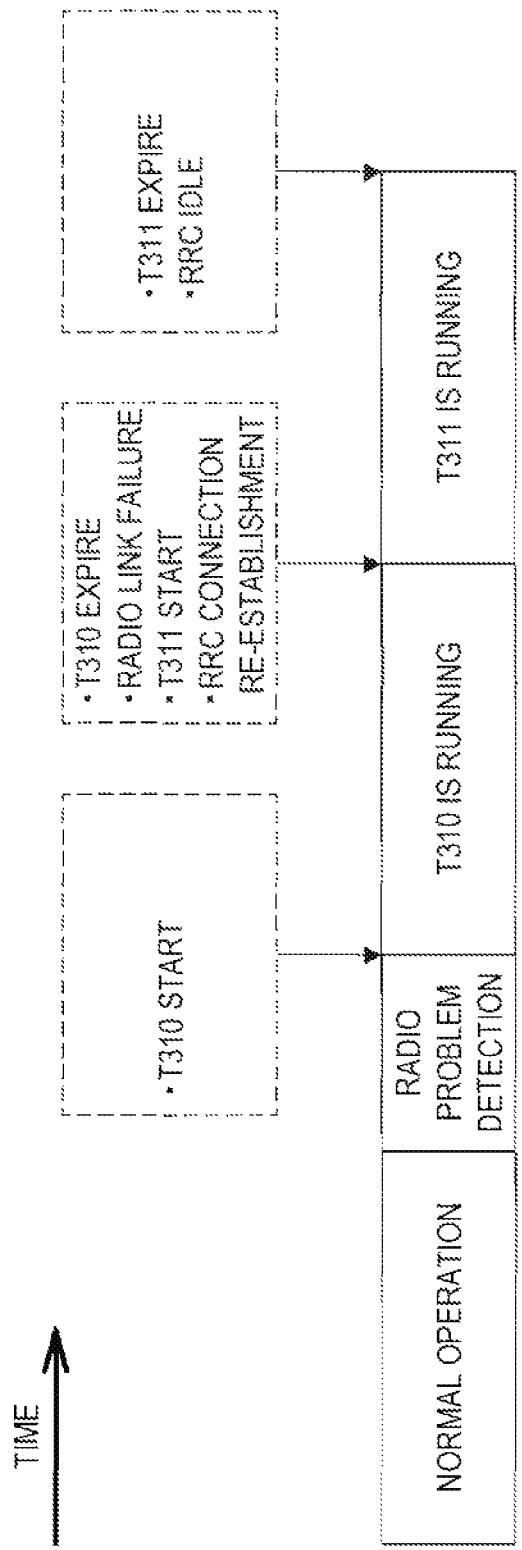
FIG. 3 is a second explanatory diagram for illustrating an example of a procedure after the detection of a radio link failure (RLF).

First, FIGS. 1 to 3 will be referenced to describe carrier aggregation in Release 10, a small cell anticipated by Release 12, backhauling between eNBs, and the conditions of backhauling for carrier aggregation.

(Carrier Aggregation in Release 10)

Component Carriers

With carrier aggregation in Release 10, up to a maximum of five component carriers (CCs) are aggregated for use by user equipment (UE). Each CC is a band with a maximum width of 20 MHz. Carrier aggregation includes a case in which successive CCs in the frequency direction are used, and a case in which separated CCs in the frequency direction are used. With carrier aggregation, the CCs to be used may be set for each UE.

PCC and SCC

In carrier aggregation, one of the multiple CCs used by a UE is a special CC. This special CC is called the primary component carrier (PCC). Also, the remaining CCs among the multiple CCs are called secondary component carriers (SCCs). The PCC may be different depending on the UE. This point will be described more specifically below with reference to FIG. 1.

FIG. 1 is an explanatory diagram for illustrating an example of the PCCs of respective UEs. Referring to FIG. 1, a UE 31A, a UE31B, and five CCs from CC1 to CC5 are illustrated. In this example, the UE 31A is using three CCs: CC1, CC2, and CC3. Additionally, the UE 31A is using CC2 as the PCC. Meanwhile, the UE 31B is using two CCs: CC2 and CC4. Additionally, the UE 31B is using CC4 as the PCC. In this way, each UE may use a different CC as the PCC.

Since the PCC is the most important CC among the multiple CCs, it is desirable for the PCC to be the CC with the most stable communication quality. Note that in actual practice, which CC to treat as the PCC depends on the implementation.

The SCC is added to the PCC. In addition, an existing SCC that has been added may also be removed. Note that changing an SCC is conducted by removing an existing SCC and adding a new SCC.

PCC Determination Method and Changing Method

When a UE connection is initially established and the status of the UE goes from Radio Resource Control (RRC) Idle to RRC Connected, the CC that the UE used during the establishment of the connection becomes the PCC for that UE. More specifically, a connection is established through a connection establishment procedure. At this point, the status of the UE goes from RRC Idle to RRC Connected. Also, the CC used in the procedure becomes the PCC for the above UE. Note that the above procedure is a procedure initiated from the UE side.

Additionally, PCC changing is conducted by a handover between frequencies. More specifically, if a handover is specified in a connection reconfiguration procedure, a PCC handover is conducted, and the PCC is changed. Note that the above procedure is a procedure initiated from the network side.

Adding SCC

As discussed above, the SCC is added to the PCC. As a result, the SCC is associated with the PCC. In other words, the SCC is subordinate to the PCC. SSC addition may be conducted through a connection reconfiguration procedure. Note that this procedure is a procedure initiated from the network side.

Removing SSC

As discussed above, an SCC may be removed. SSC removal may be conducted through a connection reconfiguration procedure. Specifically, a specific SCC specified in a message is removed. Note that the above procedure is a procedure initiated from the network side.

In addition, the removal of all SCCs may be conducted through a connection re-establishment procedure.

Special Role of PCC

The connection establishment procedure, the transmitting and receiving of non-access stratum (NAS) signaling, and the transmitting and receiving of uplink control signals on the physical uplink control channel (PUCCH) are conducted only by the PCC, and not by the SCCs.

In addition, the detection of a radio link failure (RLF) and a subsequent connection re-establishment procedure are also conducted only by the PCC, and not by the SCCs. Hereinafter, specific examples regarding this point will be described with reference to FIGS. 2 and 3.

FIG. 2 is a first explanatory diagram for illustrating an example of a procedure after the detection of an RLF. Referring to FIG. 2, if the UE detects a radio link problem (RLP) regarding the PCC after normal operation, a timer T310 is started. Subsequently, if the timer T310 expires, the UE detects an RLF, starts a timer T311, and additionally starts the connection re-establishment procedure. Subsequently, in the example illustrated in FIG. 2, the connection re-establishment procedure is successful. Also, the timer T311 stops.

FIG. 3 is a second explanatory diagram for illustrating an example of a procedure after the detection of a radio link failure (RLF). In the example illustrated in FIG. 3, the connection re-establishment procedure is unsuccessful. As a result, the timer T311 expires. Subsequently, the status of the UE goes from RRC Connected to RRC Idle. Also, if SCCs associated with the PCC exist, those SCCs are released.

Note that for the SCCs, a procedure like the above is not conducted, even if an RLP is detected.

(Small Cell Anticipated by Release 12)

In Release 12, the investigation of scenarios in which a macro cell eNB and a small cell eNB use separate frequency bands is anticipated. This point will be described more specifically below with reference to FIG. 4.

Figure 4:
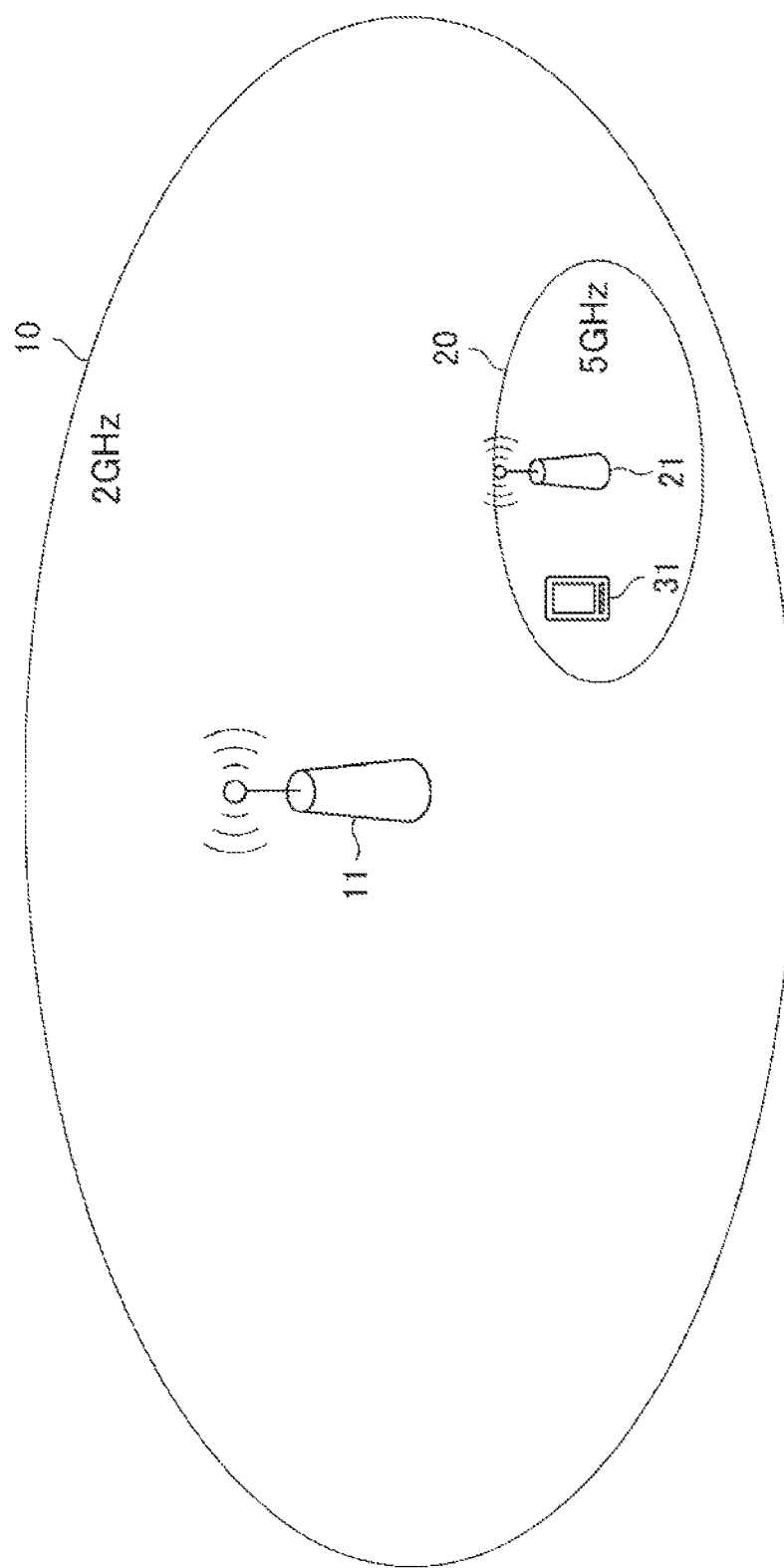
FIG. 4 is an explanatory diagram for illustrating an example of a scenario in which separate frequency bands are used by a macro cell and a small cell.

FIG. 4 is an explanatory diagram for illustrating an example of a scenario in which separate frequency bands are used by a macro cell and a small cell. Referring to FIG. 4, a macro cell 10 and a corresponding eNB 11 are illustrated. Also, a small cell 20, which completely overlaps with the macro cell 10, and a corresponding eNB 21 are illustrated. Furthermore, a UE 31 that communicates with the eNB 11 and the eNB 21 is also illustrated. On such a network, the eNB 11 uses a frequency band in the 2 GHz band as the frequency band of the macro cell 10, for example, and uses this frequency band to communicate with the UE 31. Meanwhile, the eNB 21 uses a frequency band in the 5 GHz band as the frequency band of the small cell 20, for example, and uses this frequency band to communicate with the UE 31.

In addition, since the macro cell is wide compared to the small cell, scenarios in which the macro cell eNB is responsible for the transmission of control signals are also being investigated.

(Backhauling Between eNBs)

Backhauling between eNBs is not always ideal. In particular, unlike backhauling between macro cell eNBs, backhauling between a macro cell eNB and a small cell eNB or backhauling between small cell eNBs may not be ideal. As a result, a delay on the backhaul (for example, a delay of approximately 50 ms) may be produced.

Such delays on the backhaul between eNBs may affect wireless communications in the case of carrier aggregation. As a result, there is a possibility of various problems occurring.

Specifically, for example, a UE may use a macro cell CC as the PCC, and use a small cell CC as a SCC. In this case, an uplink control signal (such as an ACK/NACK, for example) for the SCC may be transmitted by the PCC. Furthermore, for example, the uplink control signal may be transmitted from the eNB of the macro cell to the eNB of the small cell via backhauling. In such cases, for example, the uplink control signal (such as an ACK/NACK, for example) may take a large amount of time to reach the eNB of the small cell because of a delay on the backhaul. As a result, operation by the eNB of the small cell based on the uplink control signal may be delayed, and communication quality for the UE may be lowered.

Note that backhauling between eNBs is logically also called the X2 interface. Also, backhauling between eNBs physically includes one or more physical lines. One example of a physical line is an optical fiber line. The communication speed for backhauling between eNBs depends on the configuration of that backhaul (such as the type of each physical line and the number of devices that the data traverses, for example).

(Conditions of Backhauling for Carrier Aggregation)

For example, an acknowledgement (ACK) of a downlink signal on an SCC is transmitted by the PUCCH of the PCC. Since the ACK is used for the retransmission of data by the eNB, a delay of the ACK is not acceptable. Consequently, when a first eNB using a CC that acts as the PCC for a UE is different from a second eNB using a CC that acts as an SCC for the UE, a backhaul delay of approximately 10 ms between the first eNB and the second eNB is desirable.

«2. Schematic Configuration of Communication System»

Figure 5:
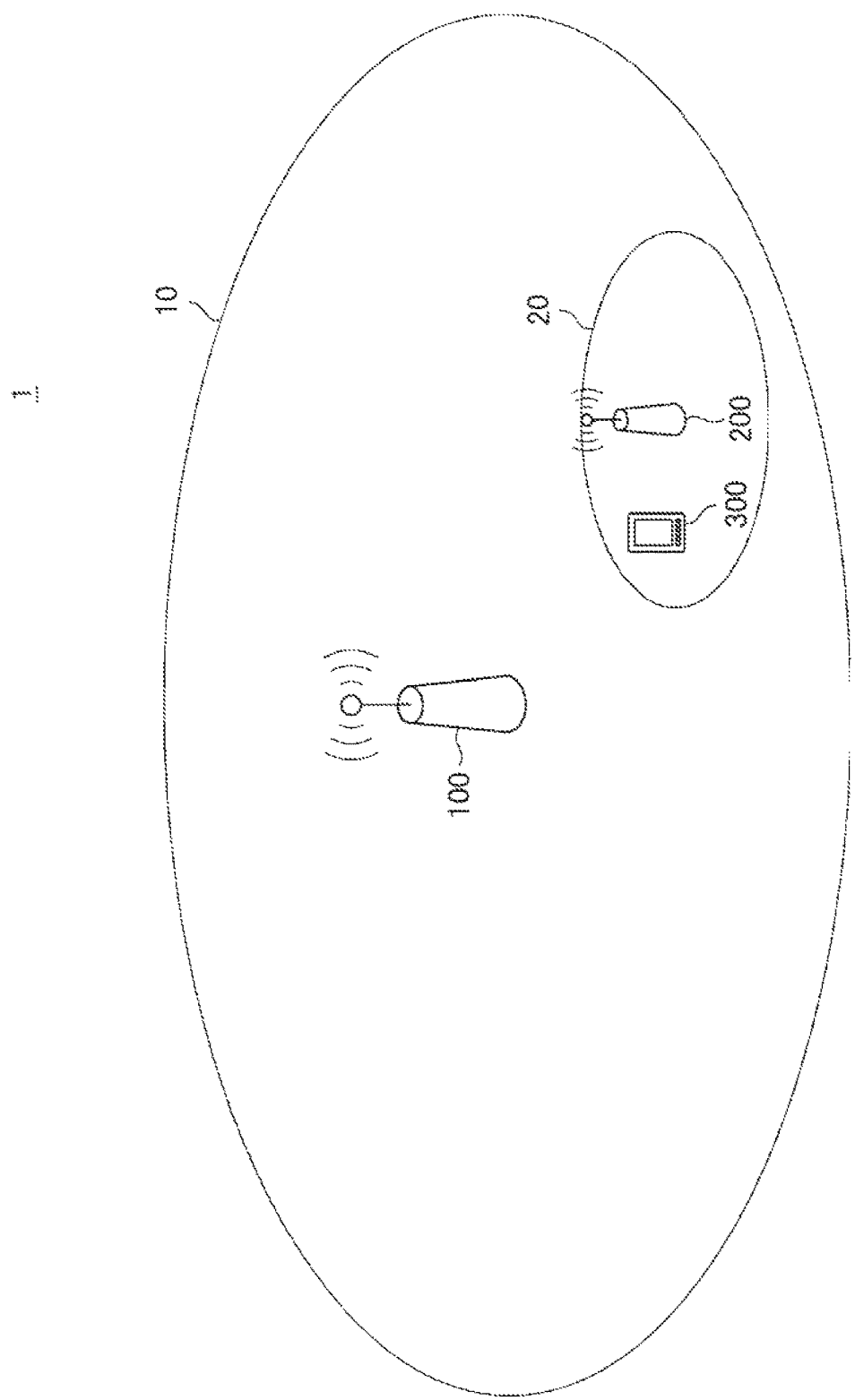
FIG. 5 illustrates a schematic configuration of a communication system according to an embodiment of the present disclosure.

Next, a schematic configuration of a communication system 1 according to an embodiment of the present disclosure will be described with reference to FIG. 5. FIG. 5 is an explanatory diagram illustrating an example of a schematic configuration of a communication system 1 according to the embodiment. Referring to FIG. 5, the communication system 1 includes a macro base station 100, a small base station 200, and a terminal device 300. Note that the communication system 1 is a communication system conforming to LTE or LTE-Advanced, for example.

(Macro Base Station 100)

The macro base station 100 wirelessly communicates with the terminal device 300 within the macro cell 10. For example, the macro base station 100 supports carrier aggregation. In other words, the macro base station 100 is able to use multiple component carriers (CCs) simultaneously for wireless communication with one terminal device 300.

As an example, one or more CCs in the 2 MHz band are used as CCs of the macro cell 10. In other words, within the macro cell 10, one or more CCs in the 2 MHz band are used for wireless communication between the macro base station 100 and the terminal device 300.

(Small Base Station 200)

The small base station 200 wirelessly communicates with the terminal device 300 within the small cell 20. The small cell 20 partially or fully overlaps with the macro cell 10. For example, the small base station 200 also supports carrier aggregation, and is able to use multiple component carriers (CCs) simultaneously for wireless communication with one terminal device 300.

For example, the small base station 200 uses separate CCs from the CCs used (at least simultaneously) by the macro base station 100. For example, the frequency band used within the small cell 20 is a higher frequency band than the frequency band used within the macro cell 10.

As an example, one or more CCs in the 5 MHz band are used as CCs of the small cell 20. In other words, within the small cell 20, one or more CCs in the 5 MHz band are used in wireless communication between the small base station 200 and the terminal device 300.

(Terminal Device 300)

The terminal device 300 wirelessly communicates with the macro base station 100 within the macro cell 10. The terminal device 300 also wirelessly communicates with the small base station 200 within the small cell 20.

In addition, the terminal device 300 supports carrier aggregation, and is able to wirelessly communicate using one PCC and one or more SCCs. As an example, the terminal device 300 wirelessly communicates with the macro base station 100 by using one PCC and one or more SCCs. As another example, the terminal device 300 wirelessly communicates with the small base station 200 by using one PCC and one or more SCCs. As yet another example, the terminal device 300 wirelessly communicates with the macro base station 100 by using one PCC (or one PCC and one or more SCCs), while also wirelessly communicating with the small base station 200 by using one or more SCCs.

«Macro Base Station Configuration»

Figure 6:
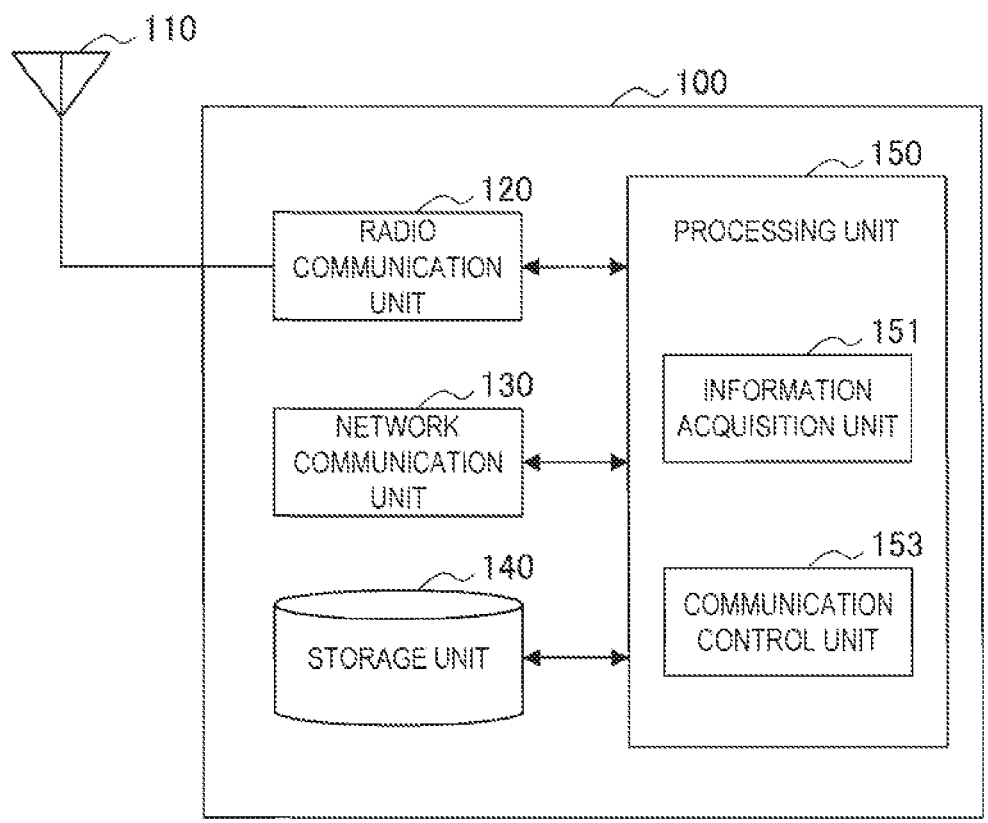
FIG. 6 illustrates an example of a configuration of a macro base station according to the embodiment.

Next, an example of the configuration of macro base station 100 according to the present embodiment will be described with reference to FIGS. 6 to 9. FIG. 6 is a block diagram illustrating an example of the configuration of the macro base station 100 according to the present embodiment. Referring to FIG. 6, the macro base station 100 is equipped with an antenna unit 110, a radio communication unit 120, a network communication unit 130, a storage unit 140, and a processing unit 150.

(Antenna Unit 110)

The antenna unit 110 emits a signal output by the radio communication unit 120 into space as a radio wave. Additionally, the antenna unit 110 converts a radio wave from space into a signal, and outputs the signal to the radio communication unit 120.

(Radio Communication Unit 120)

The radio communication unit 120 conducts radio communication. For example, the radio communication unit 120 transmits a downlink signal to the terminal device 300 positioned within the macro cell 10, and receives an uplink signal from the terminal device 300 positioned within the macro cell 10. Note that the radio communication unit 120 is able to wirelessly communicate on multiple CCs simultaneously.

(Network Communication Unit 130)

The network communication unit 130 communicates with other nodes. For example, the network communication unit 130 communicates with the small base station 200 via backhauling. Also, the network communication unit 130 communicates with a core network node (such as a Mobility Management Entity (MME) or a Serving Gateway (S-GW), for example).

(Storage Unit 140)

The storage unit 140 temporarily or permanently stores programs and data for the operation of the macro base station 100.

(Processing Unit 150)

The processing unit 150 provides various functions of the macro base station 100. The processing unit 150 includes an information acquisition unit 151 and a communication control unit 153.

(Information Acquisition Unit 151)

The information acquisition unit 151 acquires information about a terminal device that uses one CC of the macro cell 10 as the PCC.

For example, the storage unit 140 stores information about a terminal device that uses one CC of the macro cell 10 as the PCC. Subsequently, the information acquisition unit 151 acquires at least part of this information from the storage unit 140.

For example, the above information about the above terminal device includes identification information for identifying the above terminal device. The above information about the above terminal device may also include capability information for the above terminal device. The capability information may include information indicating whether the above terminal device supports carrier aggregation, for example.

Note that the above terminal device that uses one CC of the macro cell 10 as the PCC is the terminal device 300, for example.

(Communication Control Unit 153)

The communication control unit 153 conducts control related to radio communication.

(1) Setting CCs to be Used by Terminal Device

For example, the communication control unit 153 sets CCs to be used by a terminal device.

As a specific process, for example, the communication control unit 153 sets CCs to be used by a terminal device by updating setting information about CCs to be used by the terminal device.

(1-1) Setting PCC to be Used by Terminal Device

The communication control unit 153 sets the PCC to be used by a terminal device, for example.

Setting During Connection Establishment

For example, a connection with the terminal device 300 is established on a CC of the macro cell 10. More specifically, for example, the macro base station 100 and the terminal device 300 conduct the connection establishment procedure on one CC of the macro cell 10, and as a result, a connection with the terminal device 300 is established. In this case, the communication control unit 153 sets the above one CC as the PCC to be used by the terminal device 300.

As an example, setting information indicating a CC of the macro cell 10 to be used by a terminal device is stored in the macro base station 100. Subsequently, the communication control unit 153 updates the above setting information so that the above setting information indicates that the above one CC of the macro cell 10 is the PCC for the terminal device 300. As a result, the above one CC is set as the PCC to be used by the terminal device 300. The macro base station 100 then follows the above setting information and uses the above one CC as the PCC to wirelessly communicate with the terminal device 300.

Setting During Handover

For example, the PCC to be used by the terminal device 300 is changed from a first CC of the macro cell 10 to a second CC of the macro cell 10 by a handover. In this case, the communication control unit 153 sets the above second CC as the PCC to be used by the terminal device 300.

As an example, the communication control unit 153 updates the above setting information so that the above setting information indicates that the above second CC of the macro cell 10 is the PCC for the terminal device 300. As a result, the above second CC is set as the PCC to be used by the terminal device 300. The macro base station 100 then follows the above setting information and uses the above second CC as the PCC to wirelessly communicate with the terminal device 300.

(1-2) Setting Additional CC to be Used by Terminal Device

The communication control unit 153 sets an additional CC to be used by a terminal device.

For example, the communication control unit 153 sets one or more CCs of the small cell 20 as additional CCs to be used additionally by a terminal device using one CC of the macro cell 10 as the PCC.

Setting Sub PCC

Particularly, in the present embodiment, the communication control unit 153, for example, sets one CC among the above one or more CCs of the small cell 20 as a special CC by which the above terminal device (that is, the terminal device using one CC of the macro cell 10 as the PCC) is able to transmit uplink control information on an uplink control channel. In this specification, this special CC is called the "sub PCC". It should be understood that this special CC may also be called other names instead of sub PCC, such as small PCC or super SCC. Hereinafter, a specific example of setting the sub PCC will be described with reference to FIG. 7.

Figure 7:
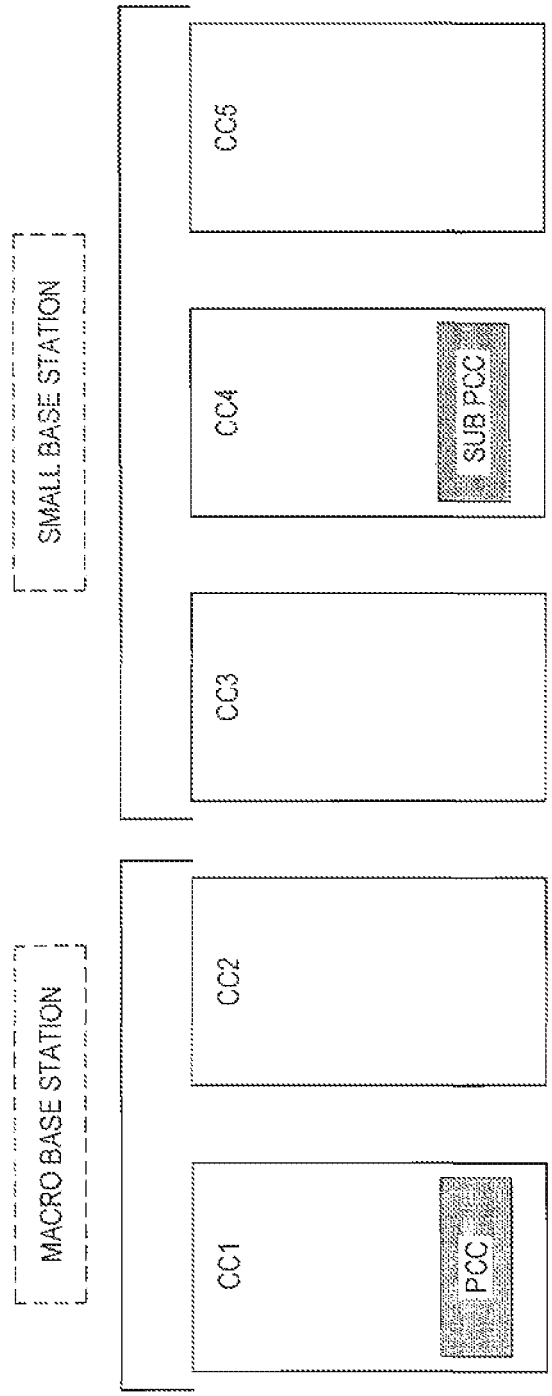
FIG. 7 is an explanatory diagram for illustrating an example of setting a sub PCC.

FIG. 7 is an explanatory diagram for illustrating an example of setting the sub PCC. Referring to FIG. 7, CC1 and CC2 used by the macro base station 100 as well as CC3, CC4, and CC5 used by the small base station 200 are illustrated. For example, when the terminal device 300 uses the five CCs from CC1 to CC5, the communication control unit 153 sets CC1 as the PCC for the terminal device 300, and sets CC4 as the sub PCC for the terminal device 300.

Characteristics of Sub PCC

As discussed above, the sub PCC is a CC of the small cell 20. Furthermore, the sub PCC is a CC by which the above terminal device (that is, the terminal device using one CC of the macro cell 10 as the PCC) is able to transmit uplink control information on an uplink control channel.

The above uplink control channel is the physical uplink control channel (PUCCH), for example. In other words, the sub PCC is a CC by which the above terminal device is able to transmit uplink control information by the PUCCH.

The above uplink control information includes, for example, an acknowledgement (ACK) and a negative acknowledgement (NACK) regarding the reception of a downlink signal. In other words, the sub PCC is a CC by which an ACK/NACK may be transmitted on an uplink control channel (for example, the PUCCH). As an example, this ACK/NACK is a hybrid automatic repeat request (HARQ) ACK/NACK.

Additionally, the above uplink control information includes, for example, a scheduling request (SR). In other words, the sub PCC is a CC by which a scheduling request (SR) may be transmitted on an uplink control channel (for example, the PUCCH).

Additionally, the above uplink control information includes, for example, periodically reported channel state information (CSI). In other words, the sub PCC is a CC by which a periodically reported CSI may be transmitted on an uplink control channel (for example, the PUCCH). Note that the CSI includes information such as a channel quality indicator (CQI), a precoding matrix indicator (PMI), a precoding type indicator (PTI), and/or a rank indicator (RI), for example.

Additionally, the above uplink control information may also include information for power control. In other words, the sub PCC may be a CC by which information for power control may be transmitted on an uplink control channel (for example, the PUCCH).

By setting the sub PCC as above, it becomes possible to reduce the effect of backhauling on wireless communications in the case of carrier aggregation.

More specifically, ordinarily uplink control information on an uplink control channel (PUCCH) is not transmitted by an SCC, and instead, uplink control information for an SCC is transmitted on an uplink control channel (PUCCH) of the PCC. For this reason, if the SCC is a CC of the small cell 20 and the PCC is a CC of the macro cell 10, a delay on the backhaul may cause uplink control information for an SCC to take a long time to reach the small base station 200. Accordingly, as discussed above, one CC of the small cell 20 is set as the sub PCC. Uplink control information is then transmitted on the uplink control channel (PUCCH) of the sub PCC. Consequently, the effect of backhauling on wireless communications is reduced, for example.

As another example, since an ACK/NACK is transmitted on the uplink control channel (PUCCH) of the sub PCC, the ACK/NACK reaches the small base station 200 rapidly. Consequently, suitable retransmission control may be possible.

As another example, since a scheduling request is transmitted on the uplink control channel (PUCCH) of the sub PCC, the scheduling request reaches the small base station 200 quickly. Consequently, rapid scheduling may be possible.

As another example, since periodically reported CSI is transmitted on the uplink control channel (PUCCH) of the sub PCC, the CSI reaches the small base station 200 quickly. Consequently, rapid adaptation of the wireless communications of the above terminal device to the environment may be possible.

Note that, as discussed above, the connection establishment procedure is conducted on the PCC. For this reason, the sub PCC for a terminal device is a CC that is not used by that terminal device to conduct the connection establishment procedure. Also, for example, the sub PCC for a terminal device is a CC that is not used to conduct NAS signaling to that terminal device.

Also, for example, the sub PCC is a CC selected for each terminal device. In other words, if the sub PCC of a certain terminal device is a first CC of the small cell 20, the sub PCC of another terminal device may be a second CC of the small cell 20.

Conditions of Setting

For example, if the backhaul between the macro base station 100 and the small base station 200 does not satisfy a prescribed quality standard, the communication control unit 153 sets the above one CC among the above one or more CCs of the small cell 20 as the sub PCC.

Specifically, for example, backhaul information indicating whether or not the backhaul between the macro base station 100 and the small base station 200 satisfies the above prescribed quality standard is stored in the storage unit 140. In other words, this backhaul information is information indicating whether or not the above backhaul is ideal. From the above backhaul information, the communication control unit 153 checks whether or not the above backhaul satisfies the above prescribed quality standard (that is, whether or not the above backhaul is ideal). Subsequently, if the above backhaul does not satisfy the above prescribed quality standard, the communication control unit 153 sets one CC of the small base station 200 as the sub PCC. Note that the above backhaul information may be predetermined information, or information that is changed dynamically according to the communication conditions on the backhaul.

Consequently, it becomes possible to set the sub PCC in cases where the delay on the backhaul may become large, for example.

As an example, the above prescribed quality standard includes standards for communication speed, throughput, and/or latency. Obviously, the above prescribed quality standard may also include other standards of quality in addition to, or instead of, these standards.

Specific Setting Method

For example, on the basis of a result of measurement by the terminal device 300 (for example, a measurement report), one CC of the small cell 20 is determined as an additional CC to be used by the terminal device 300. In this case, if the backhaul between the macro base station 100 and the small base station 200 does not satisfy the above prescribed quality standard, and in addition, the sub PCC of the terminal device 300 does not yet exist, the communication control unit 153 sets the above one CC of the small base station 200 as the sub PCC.

As an example, setting information indicating a CC of the small cell 20 to be used by a terminal device is stored in the small base station 200. Subsequently, the communication control unit 153 causes the small base station 200 to update the above setting information so that the above setting information indicates that the above one CC of the small cell 20 is the sub PCC for the terminal device 300. As an example, the communication control unit 153 provides a message with instructions to update the above setting information to the small base station 200 via the network communication unit 130, and thereby causes the small base station 200 to update the above setting information. As a result, the above one CC is set as the sub PCC to be used by the terminal device 300. The small base station 200 then follows the above setting information and uses the above one CC as the sub PCC to wirelessly communicate with the terminal device 300.

Setting SCC Associated with Sub PCC

For example, the communication control unit 153 sets a CC not set as the sub PCC from among the above one or more CCs of the small cell 20 (that is, the one or more CCs set as the above additional CCs) as an SCC associated with the sub PCC. For example, the communication control unit 153 sets each of the remaining CCs other than the sub PCC from among the above one or more CCs of the small cell 20 as an SCC associated with the sub PCC. Hereinafter, a specific example of setting SCCs associated with the sub PCC will be described with reference to FIG. 8.

Figure 8:
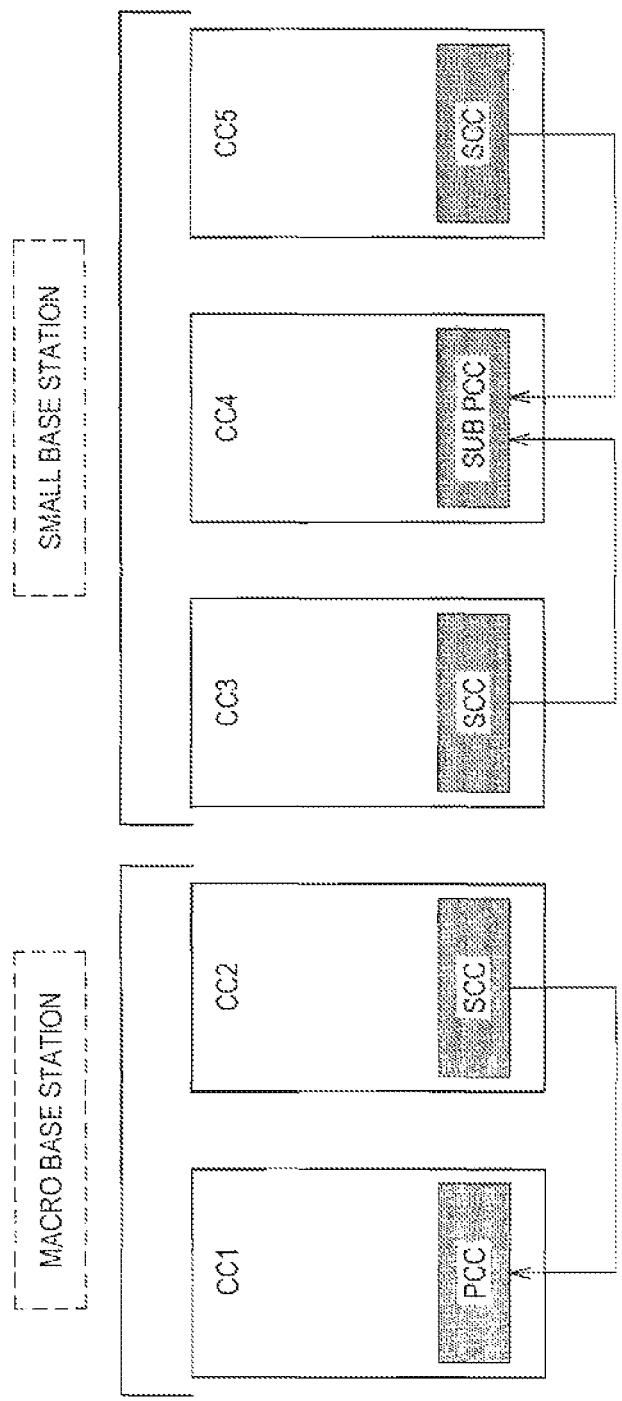
FIG. 8 is an explanatory diagram for illustrating an example of setting an SCC associated with a sub PCC.

FIG. 8 is an explanatory diagram for illustrating an example of setting SCCs associated with the sub PCC. Referring to FIG. 8, CC1 and CC2 used by the macro base station 100 as well as CC3, CC4, and CC5 used by the small base station 200 are illustrated. For example, the terminal device 300 uses the five CCs from CC1 to CC5. In this example, the communication control unit 153 sets CC1 as the PCC for the terminal device 300, and sets CC2 as an SCC associated with the PCC. In addition, the communication control unit 153 sets CC4 as the sub PCC for the terminal device 300, and sets each of CC3 and CC5 as an SCC associated with the sub PCC.

Characteristics of SCC Associated with Sub PCC

An SCC associated with the sub PCC is a CC by which a terminal device is unable to transmit the above uplink control information on the above uplink control channel. More specifically, for example, the above SCC associated with the sub PCC is a CC by which the above terminal device is unable to transmit information such as an ACK/NACK, a scheduling request, and/or CSI on the PUCCH.

In addition, the above uplink control information for an SCC associated with the sub PCC is transmitted on the above uplink control channel of the sub PCC. More specifically, for example, information such as an ACK/NACK, a scheduling request, and/or CSI for an SCC associated with the sub PCC is transmitted on the PUCCH of the sub PCC.

Consequently, for example, not only uplink control information for the sub PCC but also uplink control information for an SCC associated with the sub PCC may be transmitted on the uplink control channel (PUCCH) of the sub PCC. Consequently, the effect of backhauling on wireless communications is reduced further, for example.

Conditions of Setting

The conditions of setting an SCC associated with the sub PCC are the same as the conditions of setting the sub PCC discussed above. In other words, if the backhaul between the macro base station 100 and the small base station 200 does not satisfy a prescribed quality standard, the communication control unit 153 sets a CC not set as the sub PCC from among the above one or more CCs of the small cell 20 as an SCC associated with the sub PCC.

Specific Setting Method

For example, on the basis of a result of measurement by the terminal device 300 (for example, a measurement report), one CC of the small cell 20 is determined as an additional CC to be used by the terminal device 300. In this case, if the backhaul between the macro base station 100 and the small base station 200 does not satisfy the above prescribed quality standard, and in addition, the sub PCC of the terminal device 300 already exists, the communication control unit 153 sets the above one CC of the small base station 200 as an SCC associated with the sub PCC.

As an example, setting information indicating a CC of the small cell 20 to be used by a terminal device is stored in the small base station 200. Subsequently, the communication control unit 153 causes the small base station 200 to update the above setting information so that the above setting information indicates that the above one CC of the small cell 20 is an SCC associated with the sub PCC. As an example, the communication control unit 153 provides a message with instructions to update the above setting information to the small base station 200 via the network communication unit 130, and thereby causes the small base station 200 to update the above setting information. As a result, the above one CC is set as an SCC associated with the sub PCC. The small base station 200 then follows the above setting information and uses the above one CC as an SCC associated with the sub PCC to wirelessly communicate with the terminal device 300.

Setting SCC Associated with PCC

The communication control unit 153 may set each of the above one or more CCs of the small cell 20 (that is, the one or more CCs set as the above additional CCs) as an SCC associated with the PCC. Hereinafter, a specific example of setting an SCC associated with the PCC will be described with reference to FIG. 9.

Figure 9:
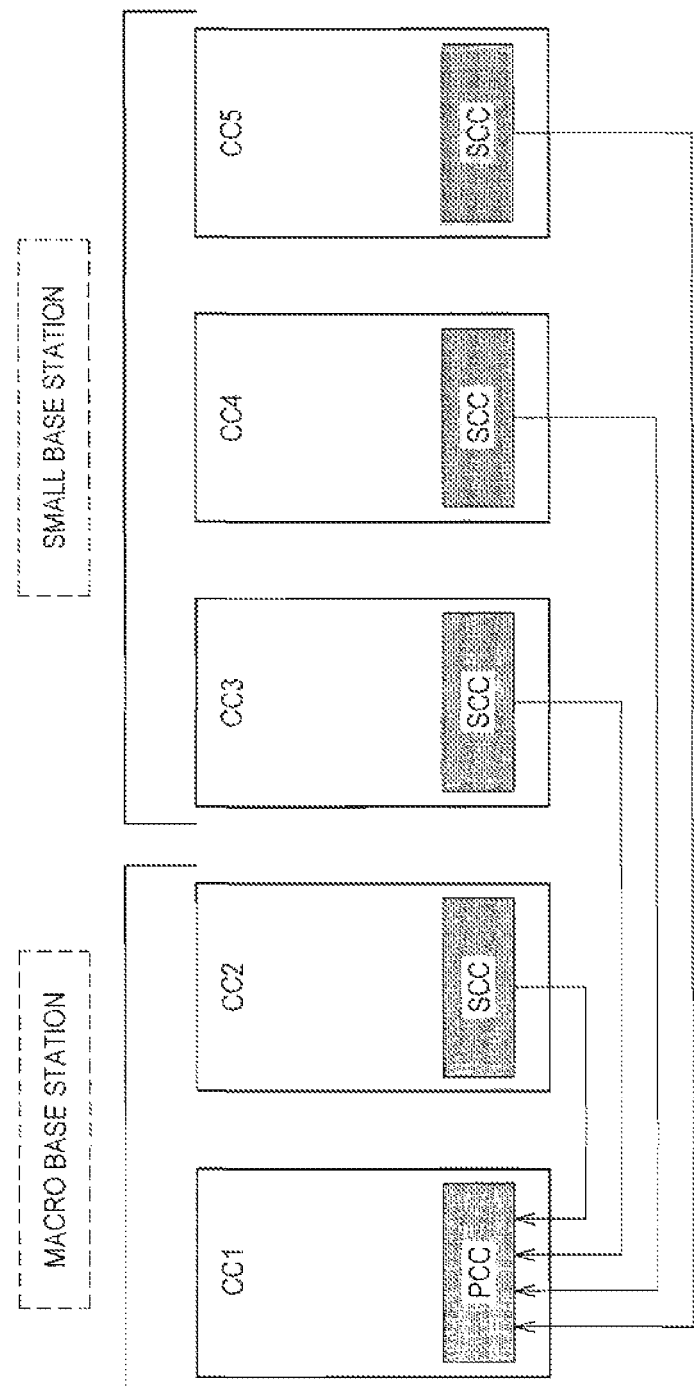
FIG. 9 is an explanatory diagram for illustrating an example of setting an SCC associated with a PCC.

FIG. 9 is an explanatory diagram for illustrating an example of setting an SCC associated with the PCC. Referring to FIG. 9, CC1 and CC2 used by the macro base station 100 as well as CC3, CC4, and CC5 used by the small base station 200 are illustrated. For example, the terminal device 300 uses the five CCs from CC1 to CC5. In this example, the communication control unit 153 sets CC1 as the PCC for the terminal device 300, and sets CC2 to CC5 as SCCs associated with the PCC.

Conditions of Setting

For example, if the backhaul between the macro base station 100 and the small base station 200 satisfies a prescribed quality standard, the communication control unit 153 sets each of the above one or more CCs of the small cell 20 as an SCC associated with the PCC.

Specifically, for example, as discussed above, the above backhaul information (that is, information indicating whether or not the backhaul between the macro base station 100 and the small base station 200 satisfies the above prescribed quality standard) is stored in the storage unit 140. From the above backhaul information, the communication control unit 153 checks whether or not the above backhaul satisfies the above prescribed quality standard (that is, whether or not the above backhaul is ideal). Subsequently, if the above backhaul satisfies the above prescribed quality standard, the communication control unit 153 sets CCs of the small base station 200 as SCCs associated with the PCC.

Consequently, for example, if a small delay on the backhaul is anticipated, it becomes possible to treat the CCs of the small cell as SCCs associated with the PCC. For this reason, the small base station 200 may be dedicated to transmitting and receiving data, for example. As a result, throughput in the small cell 20 may be improved.

Specific Setting Method

For example, on the basis of a result of measurement by the terminal device 300 (for example, a measurement report), one CC of the small cell 20 is determined as an additional CC to be used by the terminal device 300. In this case, if the backhaul between the macro base station 100 and the small base station 200 satisfies the above prescribed quality standard, the communication control unit 153 sets the above one CC of the small cell 20 as an SCC associated with the PCC (a CC of the macro cell 10).

As an example, setting information indicating a CC of the small cell 20 to be used by a terminal device is stored in the small base station 200. Subsequently, the communication control unit 153 causes the small base station 200 to update the above setting information so that the above setting information indicates that the above one CC of the small cell 20 is an SCC associated with the PCC (a CC of the macro cell 10). As an example, the communication control unit 153 provides a message with instructions to update the above setting information to the small base station 200 via the network communication unit 130, and thereby causes the small base station 200 to update the above setting information. As a result, the above one CC is set as an SCC associated with the PCC (a CC of the macro cell 10). The small base station 200 then follows the above setting information and uses the above one CC as an SCC associated with the PCC to wirelessly communicate with the terminal device 300.

As above, a CC of the small cell 10 is set as an additional CC to be used by a terminal device that uses one CC of the macro cell 10 as the PCC. More specifically, the relevant CC of the small cell 10 is set as the sub PCC, an SCC associated with the sub PCC, or an SCC associated with the PCC.

(2) Notification to Terminal Device

When setting a CC as an additional CC to be used by a terminal device, for example, the communication control unit 153 notifies the relevant terminal device that the relevant CC is added.

For example, when setting a CC of the small cell 20 as an additional CC to be used by a terminal device, the communication control unit 153 notifies the relevant terminal device that the relevant CC of the small cell 20 is added.

Notification of Addition of Sub PCC

For example, when newly setting a CC of the small cell 20 as an additional CC to be used by a terminal device, if the relevant CC is set as the sub PCC, the communication control unit 153 notifies the above terminal device that the relevant CC is added as the sub PCC.

More specifically, for example, the communication control unit 153 notifies the above terminal device that the above CC is added as the sub PCC in a message during the connection reconfiguration procedure. The relevant message includes information for specifying the above CC and information indicating that the above CC is the sub PCC, for example. Also, as an example, the above message is a message with a command for adding a secondary cell as the sub PCC.

According to such a notification, for example, a terminal device using a CC of the macro cell 10 as the PCC becomes able to learn which CC is the sub PCC for the relevant terminal device. For this reason, the relevant terminal device becomes able to actually transmit uplink control information on the uplink control channel of the sub PCC. Note that since the terminal device conducts procedures such as the connection establishment procedure on the PCC, the PCC is self-evident to the terminal device, but since the terminal device does not conduct procedures such as the connection establishment procedure on the sub PCC, the sub PCC is not self-evident to the terminal device. For this reason, a notification like the above is particularly effective.

Notification of Addition of SCC Associated with Sub PCC

For example, when newly setting a CC of the small cell 20 as an additional CC to be used by a terminal device, if the relevant CC is set as an SCC associated with the sub PCC, the communication control unit 153 notifies the above terminal device that the relevant CC is added as an SCC associated with the sub PCC.

More specifically, for example, the communication control unit 153 notifies the above terminal device that the above CC is added as an SCC associated with the sub PCC in a message during the connection reconfiguration procedure. The relevant message includes information for specifying the above CC and information indicating that the above CC is an SCC associated with the sub PCC, for example. Also, as an example, the above message is a message with a command for adding a secondary cell as an SCC associated with the sub PCC.

According to such a notification, for example, a terminal device using a CC of the macro cell 10 as the PCC becomes able to learn which CC is an SCC associated with the sub PCC. For this reason, the relevant terminal device becomes able to actually transmit uplink control information for the relevant SCC on the uplink control channel of the sub PCC.

Notification of Addition of SCC Associated with PCC

For example, when newly setting a CC of the small cell 20 as an additional CC to be used by a terminal device, if the relevant CC is set as an SCC associated with the PCC, the communication control unit 153 notifies the above terminal device that the relevant CC is added as an SCC.

As an example, the communication control unit 153 simply notifies the above terminal device that the above CC is added as an SCC in a message during the connection reconfiguration procedure. The relevant message includes information for specifying the above CC, for example. Also, as an example, the above message is a message with a command for adding a secondary cell.

«4. Terminal Device Configuration»

Figure 10:
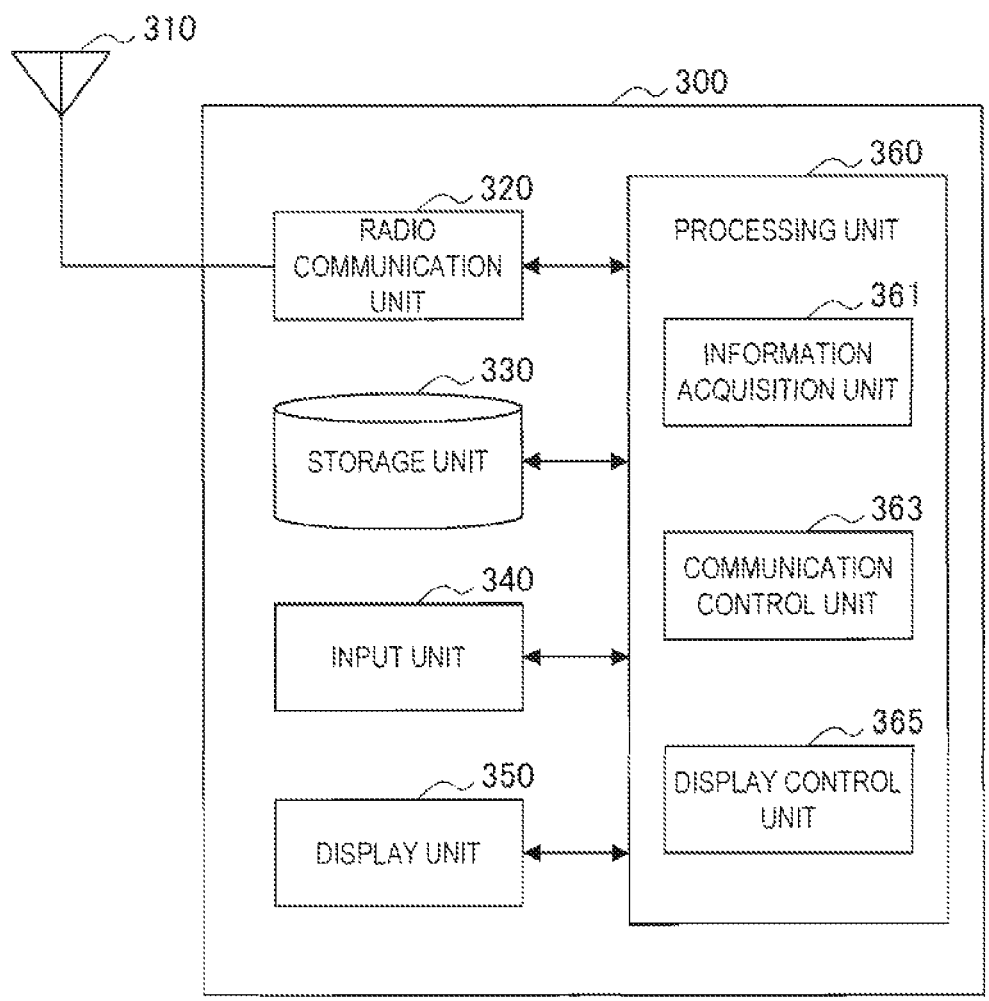
FIG. 10 is a block diagram illustrating an example of a configuration of a terminal device according to the embodiment.

Next, FIG. 10 will be referenced to describe an example of a configuration of the terminal device 300 according to the present embodiment. FIG. 10 is a block diagram illustrating an example of a configuration of the terminal device 300 according to the present embodiment. Referring to FIG. 10, the terminal device 300 is equipped with an antenna unit 310, a radio communication unit 320, a storage unit 330, an input unit 340, a display unit 350, and a processing unit 360.

(Antenna Unit 310)

The antenna unit 310 emits a signal output by the radio communication unit 320 into space as a radio wave. Additionally, the antenna unit 310 converts a radio wave from space into a signal, and outputs the signal to the radio communication unit 320.

(Radio Communication Unit 320)

The radio communication unit 320 conducts radio communication. For example, if the terminal device 300 is positioned inside the macro cell 10, the radio communication unit 320 receives a downlink signal from the macro base station 100, and transmits an uplink signal to the macro base station 100. As another example, if the terminal device 300 is positioned inside the small cell 20, the radio communication unit 320 receives a downlink signal from the small base station 200, and transmits an uplink signal to the small base station 200.

(Storage Unit 330)

The storage unit 330 temporarily or permanently stores programs and data for the operation of the terminal device 300.

(Input Unit 340)

The input unit 340 receives input from a user of the terminal device 300. The input unit 340 then provides an input result to the processing unit 360.

(Display Unit 350)

The display unit 350 displays an output screen (that is, an output image) from the terminal device 300. For example, the display unit 350 displays an output screen according to control by the processing unit 360 (display control unit 365).

(Information Acquisition Unit 351)

The information acquisition unit 351 acquires information about an additional CC to be used additionally by the terminal device 300.

For example, the above information about the above additional CC includes information for specifying the relevant additional CC. As an example, the relevant information for specifying the above additional CC is identification information for identifying the above additional CC.

As a specific example, if a CC of the small cell 20 is set as an additional CC to be used additionally by the terminal device 300, the terminal device 300 is notified of the addition of the above CC of the small cell 20. As an example, the terminal device 300 is notified of the addition of the above CC of the small cell 20 in a message during the connection reconfiguration procedure. This message includes information for specifying the above CC, and this information is stored in the storage unit 330. Subsequently, the information acquisition unit 351 acquires information for specifying the above CC from the storage unit 330, for example.

Note that, as a first example, when the above CC is added as the sub PCC, the above message additionally includes information indicating that the above CC is the sub PCC. In this case, information for specifying the above CC is stored in the storage unit 330 as information for specifying the sub PCC. As a second example, when the above CC is added as an SCC associated with the sub PCC, the above message additionally includes information indicating that the above CC is an SCC associated with the sub PCC. In this case, information for specifying the above CC is stored in the storage unit 330 as information for specifying an SCC associated with the sub PCC. As a third example, when the above CC is added as an SCC associated with the PCC, the above message does not include additional information as discussed above. In this case, information for specifying the above CC is stored in the storage unit 330 as information for specifying an SCC associated with the PCC.

Case of Sub PCC

For example, the terminal device 300 uses one CC of the macro cell 10 as the PCC. Also, one or more CCs of the small cell 20 are set as additional CCs to be used additionally by the terminal device 300, and one CC among these one or more CCs is set as the sub PCC. In this case, the information acquisition unit 351 acquires information about the relevant one CC (that is, the sub PCC).

Case of SCC Associated with Sub PCC

For example, the terminal device 300 uses one CC of the macro cell 10 as the PCC. Also, one or more CCs of the small cell 20 are set as additional CCs to be used additionally by the terminal device 300, and one CC not set as the sub PCC from among these one or more CCs is set as an SCC associated with the sub PCC. In this case, the information acquisition unit 351 acquires information about the relevant one CC set as an SCC associated with the sub PCC.

Case of SCC Associated with PCC

For example, the terminal device 300 uses one CC of the macro cell 10 as the PCC. Also, each of one or more CCs of the small cell 20 is set as an additional CC to be used additionally by the terminal device 300, and more specifically, may be set as an SCC associated with the PCC. In this case, the information acquisition unit 351 acquires information about the above one or more CCs respectively set as an SCC associated with the PCC.

(Communication Control Unit 363)

The communication control unit 363 conducts control related to wireless communication by the terminal device 300.

For example, the communication control unit 363 controls wireless communication by the terminal device 300 so that uplink control information is transmitted on an uplink control channel.

Transmission on Uplink Control Channel of Sub PCC

Particularly, in the present embodiment, the communication control unit 363 controls wireless communication on one CC set as the sub PCC so that uplink control information is transmitted on the uplink control channel of the above one CC.

As discussed above, the above uplink control channel is the PUCCH, for example. Also, the above uplink control information includes information such as an ACK/NACK, a scheduling request, and/or periodically reported CSI. In other words, for example, the communication control unit 363 controls wireless communication on one CC set as the sub PCC so that information such as an ACK/NACK, a scheduling request, and/or periodically reported CSI is transmitted on the PUCCH of the above one CC.

Specifically, for example, the communication control unit 363 maps a signal of the above uplink control information to a radio resource for the above uplink control channel (PUCCH) of the above one CC set as the sub PCC. Consequently, the above uplink control information is transmitted on the above uplink control channel (PUCCH).

Note that the communication control unit 363 controls wireless communication on the sub PCC so that not only uplink control information for the sub PCC but also uplink control information for an SCC associated with the sub PCC is transmitted on the uplink control channel of the sub PCC.

Transmission on Uplink Control Channel of PCC

For example, the communication control unit 363 controls wireless communication on one CC set as the PCC so that uplink control information is transmitted on the uplink control channel of the above one CC. The above one CC set as the PCC is a CC of the macro cell 10, for example.

For example, the communication control unit 363 controls wireless communication on one CC set as the PCC so that information such as an ACK/NACK, a scheduling request, and/or periodically reported CSI is transmitted on the PUCCH of the above one CC.

Specifically, for example, the communication control unit 363 maps a signal of the above uplink control information to a radio resource for the above uplink control channel (PUCCH) of the above one CC set as the PCC. Consequently, the above uplink control information is transmitted on the above uplink control channel (PUCCH).

Note that the communication control unit 363 controls wireless communication on the PCC so that not only uplink control information for the PCC but also uplink control information for an SCC associated with the PCC is transmitted on the uplink control channel of the PCC.

(Display Control Unit 365) The display control unit 365 controls the display of an output screen by the display unit 350. For example, the display control unit 365 generates an output screen to be displayed by the display unit 350, and causes the display unit 350 to display that output screen.

«5. Process Flow»

Next, FIGS. 11 to 14 will be referenced to describe an example of a process according to the present embodiment.

(Process Related to Setting Additional CC)

Figure 11:
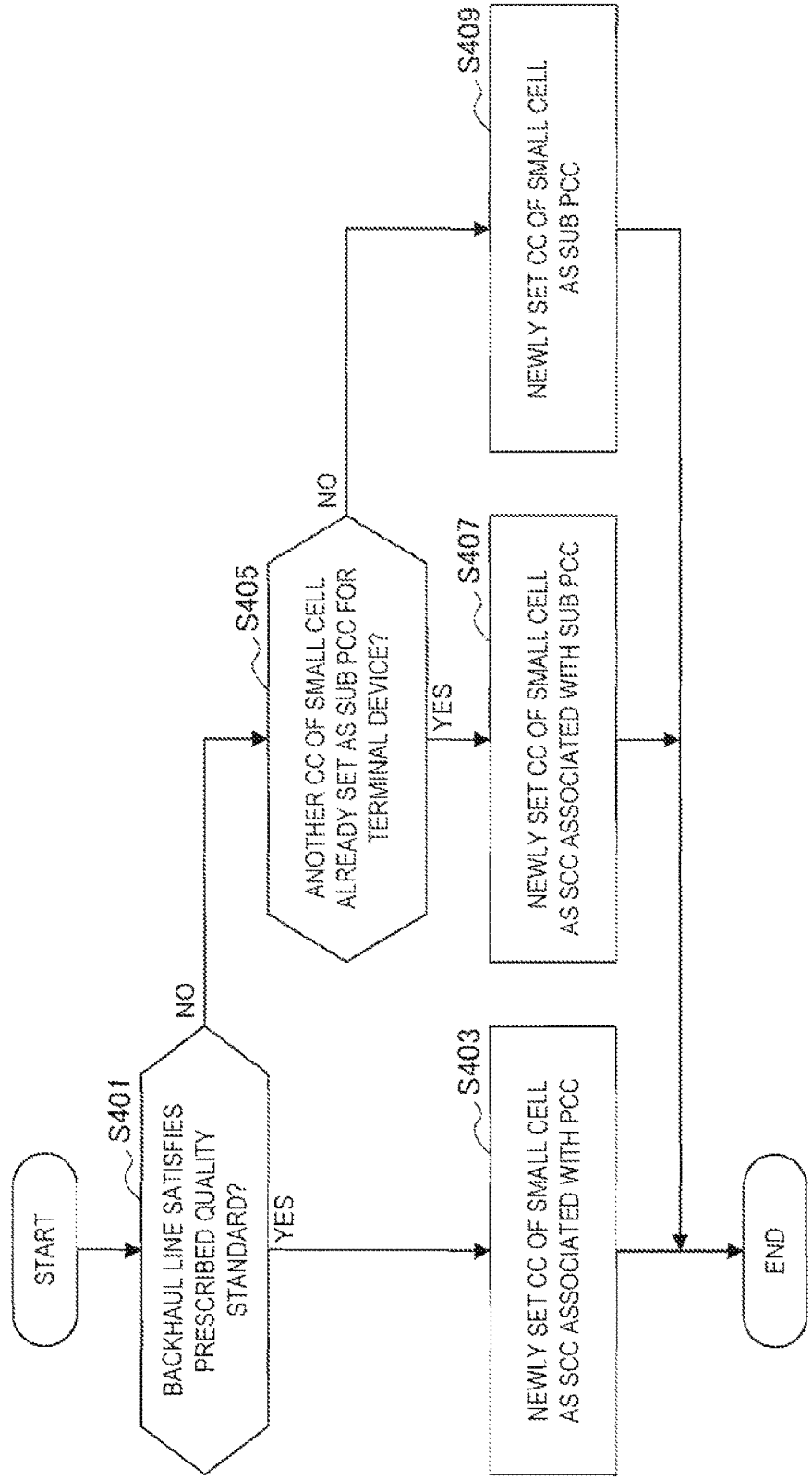
FIG. 11 is a flowchart illustrating an example of a diagrammatic flow of a process related to setting an additional CC according to the embodiment.

FIG. 11 is a flowchart illustrating an example of a diagrammatic flow of a process related to setting an additional CC according to the present embodiment. Note that this process is executed after a CC of the macro cell 10 is decided as the PCC and a CC of the small cell 20 is decided as an additional CC to be used additionally by the terminal device 300.

First, if the backhaul between the macro base station 100 and the small base station 200 satisfies a prescribed quality standard (S401: YES), the communication control unit 153 newly sets a CC of the small cell 20 as an SCC associated with the PCC (a CC of the macro cell 10) (S403). The process then ends.

If the above backhaul does not satisfy the above prescribed quality standard (S401: NO), and if another CC of the small cell 20 is already set as the sub PCC for the terminal device 300 (S405: YES), the communication control unit 153 newly sets a CC of the small cell 20 as an SCC associated with the sub PCC (S407). The process then ends.

If no CC of the small cell 20 has been set as the sub PCC for the terminal device 300 (S405: NO), the communication control unit 153 newly sets a CC of the small cell 20 as the sub PCC (S409). The process then ends.

(Connection Reconfiguration Procedure: SCC Associated with PCC)

Figure 12:
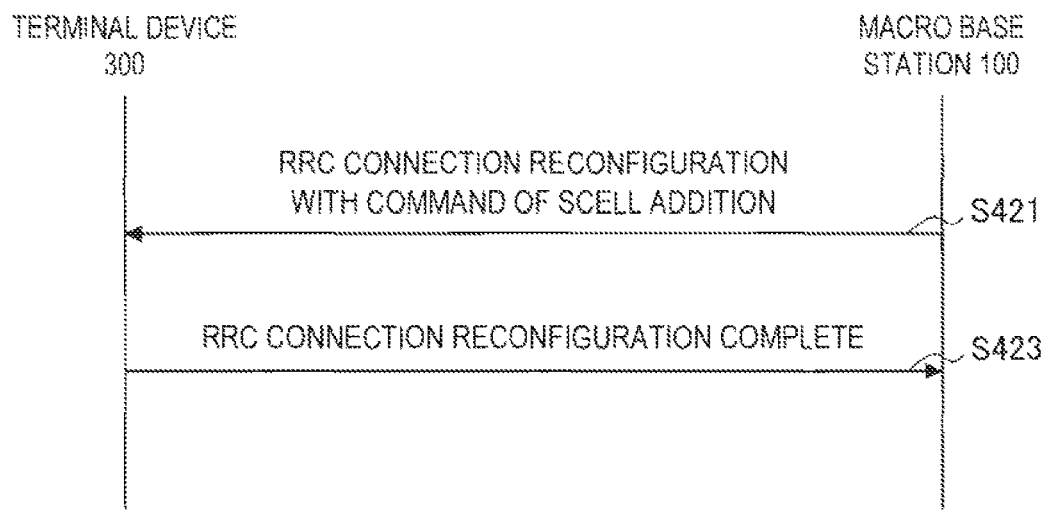
FIG. 12 is a flowchart illustrating a first example of a diagrammatic flow of a connection reconfiguration procedure according to the embodiment.

FIG. 12 is a flowchart illustrating a first example of a diagrammatic flow of a connection reconfiguration procedure according to the present embodiment. The first example is an example for a case in which a CC of the small cell 20 is newly set as an SCC associated with the PCC like in step S403 illustrated in FIG. 11.

First, the macro base station 100 transmits, in the PCC (a CC of the macro cell 10) for the terminal device 300, an RRC Connection Reconfiguration message with a command for adding a secondary cell to the terminal device 300 (S421).

Subsequently, after connection reconfiguration is completed, the terminal device 300 transmits, in the PCC for the terminal device 300, an RRC Connection Reconfiguration Complete message to the macro base station 100 (S423). The procedure then ends.

(Connection Reconfiguration Procedure: Sub PCC)

Figure 13:
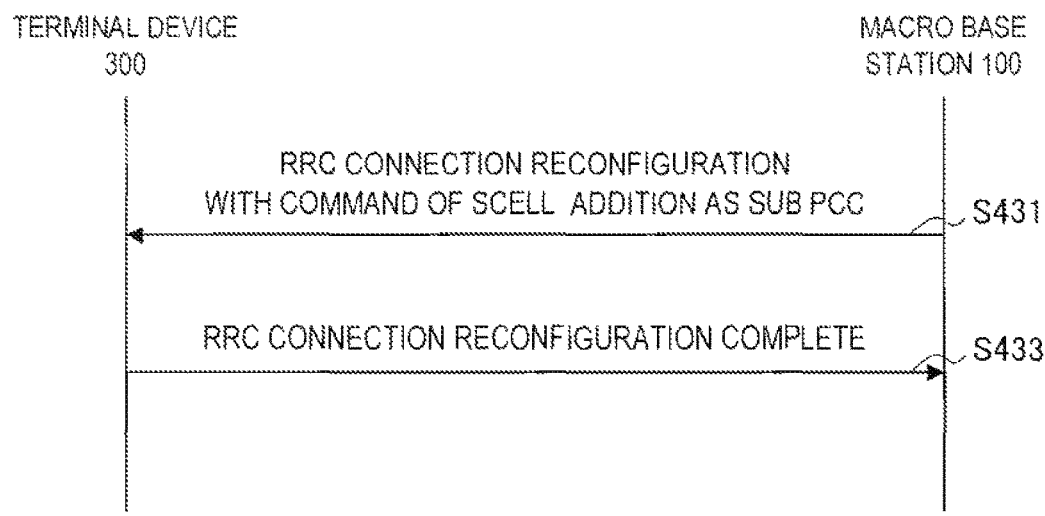
FIG. 13 is a flowchart illustrating a second example of a diagrammatic flow of a connection reconfiguration procedure according to the embodiment.

FIG. 13 is a flowchart illustrating a second example of a diagrammatic flow of a connection reconfiguration procedure according to the present embodiment. The second example is an example for a case in which a CC of the small cell 20 is newly set as the sub PCC like in step S409 illustrated in FIG. 11.

First, the macro base station 100 transmits, in the PCC (a CC of the macro cell 10) for the terminal device 300, an RRC Connection Reconfiguration message with a command for adding a secondary cell as the sub PCC to the terminal device 300 (S431).

Subsequently, after connection reconfiguration is completed, the terminal device 300 transmits, in the PCC for the terminal device 300, an RRC Connection Reconfiguration Complete message to the macro base station 100 (S433). The procedure then ends.

(Connection Reconfiguration Procedure: SCC Associated with Sub PCC)

Figure 14:
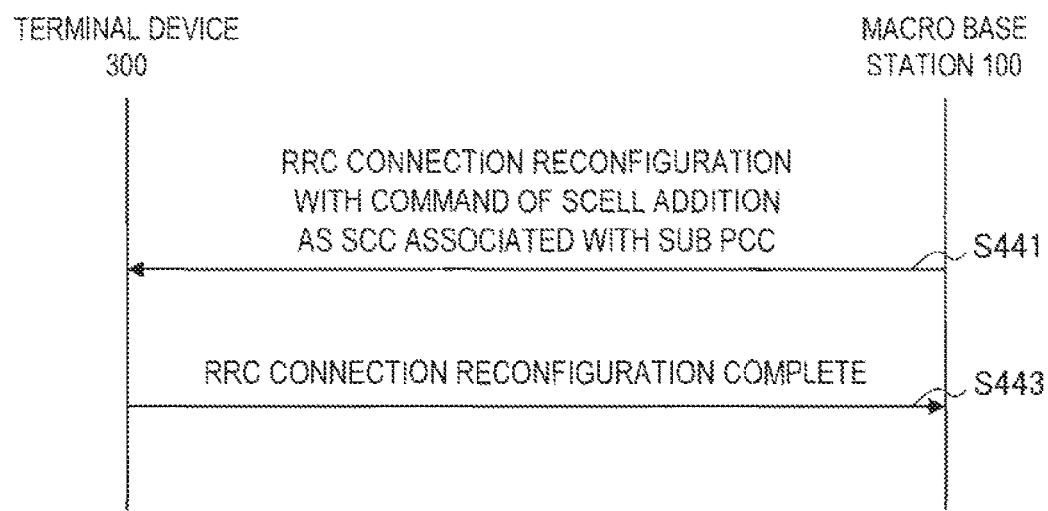
FIG. 14 is a flowchart illustrating a third example of a diagrammatic flow of a connection reconfiguration procedure according to the embodiment.

FIG. 14 is a flowchart illustrating a third example of a diagrammatic flow of a connection reconfiguration procedure according to the present embodiment. The third example is an example for a case in which a CC of the small cell 20 is newly set as an SCC associated with the sub PCC like in step S407 illustrated in FIG. 11.

First, the macro base station 100 transmits, in the PCC (a CC of the macro cell 10) for the terminal device 300, an RRC Connection Reconfiguration message with a command for adding a secondary cell as an SCC associated with the sub PCC to the terminal device 300 (S441).

Subsequently, after connection reconfiguration is completed, the terminal device 300 transmits, in the PCC for the terminal device 300, an RRC Connection Reconfiguration Complete message to the macro base station 100 (S433). The procedure then ends.

«6. Modifications»

Next, modifications of the present embodiment will be described with reference to FIGS. 15 to 21.

<6.1. First Modification>

First, a first modification of the present embodiment will be described with reference to FIGS. 15 and 16.

According to the first modification of the present embodiment, one CC set as an SCC associated with the sub PCC is newly set as the sub PCC, thereby changing the sub PCC. Consequently, it becomes possible to update the sub PCC with a reduced burden, for example.

(Macro Base Station 100: Communication Control Unit 153)

(1-2) Setting Additional CC to be Used by Terminal Device

Setting Sub PCC

In the first modification of the present embodiment, the communication control unit 153 changes the sub PCC by newly setting, as the sub PCC, one CC currently set as an SCC associated with the sub PCC.

For example, the changing of the sub PCC from a first CC currently set as the sub PCC to a second CC currently set as an SCC associated with the sub PCC is decided on the basis of a result of measurement by the terminal device 300 (for example, a measurement report). Subsequently, the communication control unit 153 sets the above second CC as the sub PCC.

As an example, setting information indicating a CC of the small cell 20 to be used by a terminal device is stored in the small base station 200. Subsequently, the communication control unit 153 causes the small base station 200 to update the above setting information so that the above setting information indicates that the above second CC of the small cell 20 is the sub PCC for the terminal device 300. As a result, the above second CC is set as the sub PCC to be used by the terminal device 300. The small base station 200 then follows the above setting information and uses the above second CC as the sub PCC to wirelessly communicate with the terminal device 300. In this way, the sub PCC is changed from the above first CC to the above second CC.

Consequently, for example, changing the sub PCC does not require a complicated procedure like a handover, unlike changing the PCC. For this reason, the sub PCC may be changed with a reduced burden, for example.

Note that the above first CC that was set as the sub PCC may be set as an SCC associated with the changed sub PCC (that is, the above second CC), or removed from the additional CCs used by the terminal device 300.

Association with Sub PCC after Change of Sub PCC

For example, after the change of the sub PCC, another CC set as an SCC associated with the sub PCC is associated with the above one CC newly set as the sub PCC. Hereinafter, a specific example regarding this point will be described with reference to FIG. 15.

Figure 15:
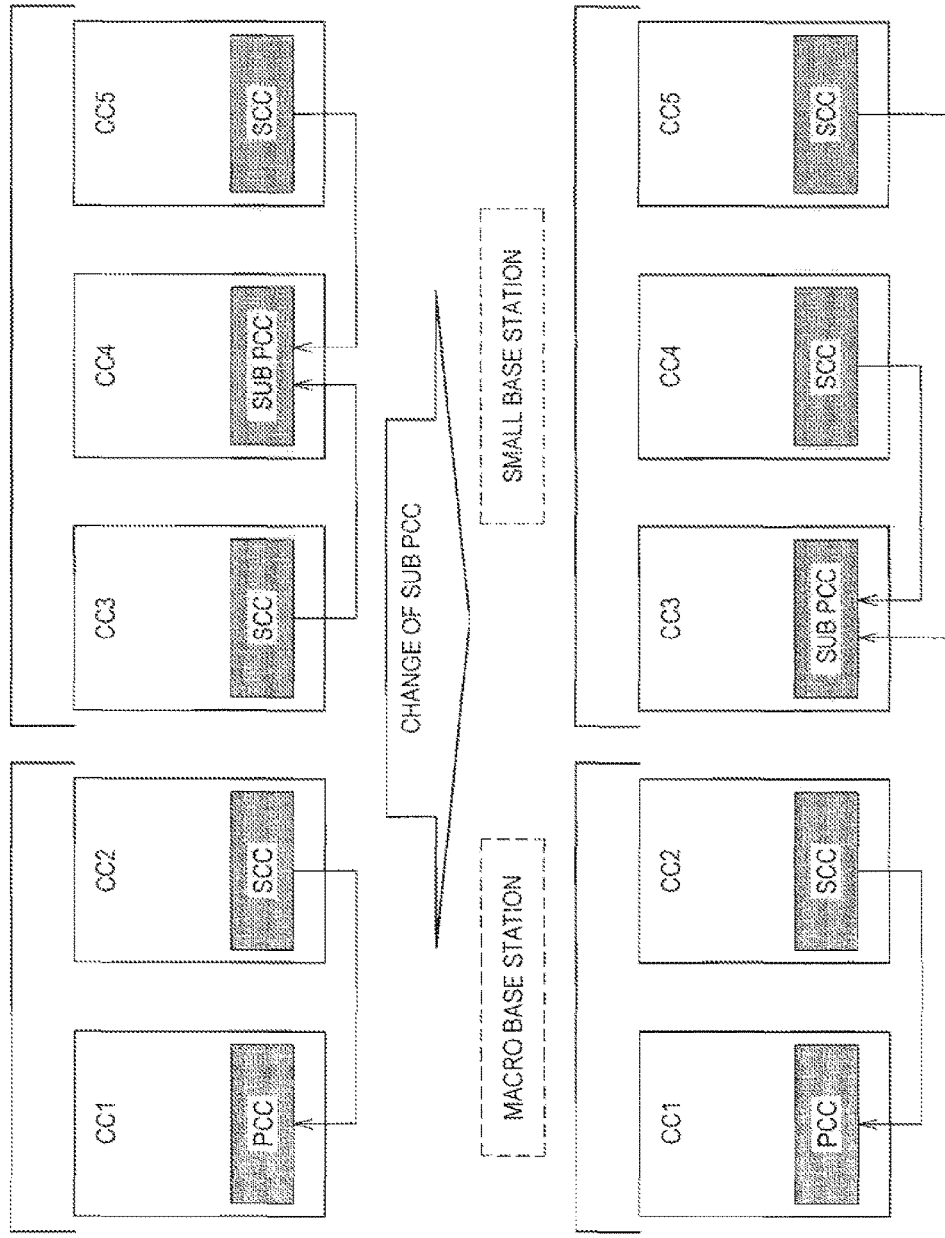
FIG. 15 is an explanatory diagram for illustrating an example of changing a sub PCC and associating an SCC.

FIG. 15 is an explanatory diagram for illustrating an example of changing a sub PCC and associating an SCC. Referring to FIG. 15, for example, before the change of the sub PCC, CC4 is the sub PCC for the terminal device 300, and each of CC3 and CC5 is an SCC associated with the sub PCC. After that, the sub PCC is changed, and CC3 becomes the sub PCC for the terminal device 300, while each of CC4 and CC5 becomes an SCC associated with the sub PCC. In this way, before the change of the sub PCC, CC5 is associated with CC4 which acts as the sub PCC at that time, but after the change of the sub PCC, CC5 is associated with CC3 which acts as the sub PCC at that time.

Consequently, for example, even if the sub PCC is changed, an SCC associated with the sub PCC is not deactivated, but instead continues to be used. For this reason, re-adding a CC is not necessary, and thus the burden may be reduced. In other words, the sub PCC may be changed with a reduced burden.

Note that, for example, if two or more CCs of the small cell 20 are additional CCs to be used by the terminal device 300, and one CC of the two or more CCs is the sub PCC, the remaining CCs among the above two or more CCs are SCCs associated with the sub PCC. Thus, the target of association for a CC (for example, CC5 in FIG. 15) may be changed without conducting some kind of process in particular. However, if association information indicating the target of association for a CC exists, obviously the target of association for a CC (for example, CC5 in FIG. 15) may be changed by updating the association information. The relevant association information may be information that is part of the above setting information, or information that is separate from the above setting information.

(2) Notification to Terminal Device

Notification of Change of Sub PCC

For example, during the change of the sub PCC, the communication control unit 153 notifies the above terminal device that the sub PCC is changed to the above one CC newly set as the sub PCC.

More specifically, for example, the communication control unit 153 notifies the above terminal device that the sub PCC is changed to the above one CC newly set as the sub PCC in a message during the connection reconfiguration procedure. The relevant message includes information for specifying the CC to act as the sub PCC after the change and information indicating that the sub PCC is changed to the relevant CC, for example. As an example, the above message is a message with a command for changing the sub PCC.

According to such a notification, for example, a terminal device using a CC of the macro cell 10 as the PCC becomes able to learn of the change of the sub PCC. For this reason, the relevant terminal device becomes able to actually transmit uplink control information on the uplink control channel of the sub PCC after the change of the sub PCC.

(Terminal Device 300: Communication Control Unit 363)

In the first embodiment of the present embodiment, the sub PCC is changed as discussed above. In other words, one CC currently set as an SCC associated with the sub PCC is newly set as the sub PCC. In this case, the communication control unit 363 controls wireless communication on the above one CC newly set as the sub PCC so that uplink control information is transmitted on the uplink control channel of the above one CC.

(Process Flow: Connection Reconfiguration Procedure)

Figure 16:
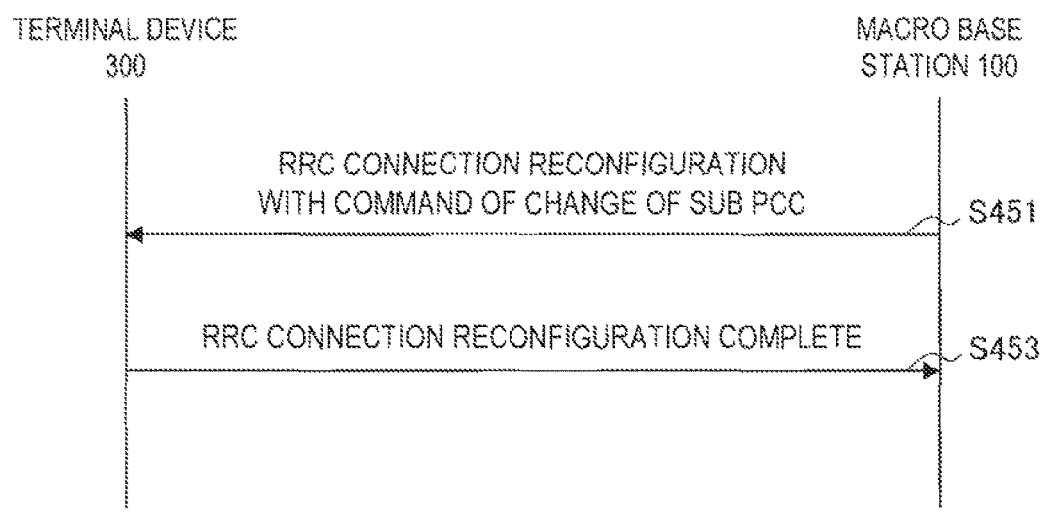
FIG. 16 is a flowchart illustrating an example of a diagrammatic flow of a connection reconfiguration procedure according to a first modification of the embodiment.

FIG. 16 is a flowchart illustrating an example of a diagrammatic flow of a connection reconfiguration procedure according to the first modification of the present embodiment. This procedure is the procedure for the case in which the sub PCC is changed.

First, the macro base station 100 transmits, in the PCC (a CC of the macro cell 10) for the terminal device 300, an RRC Connection Reconfiguration message with a command for changing the sub PCC to the terminal device 300 (S451).

Subsequently, after connection reconfiguration is completed, the terminal device 300 transmits, in the PCC for the terminal device 300, an RRC Connection Reconfiguration Complete message to the macro base station 100 (S453). The procedure then ends.

<6.2. Second Modification>

Next, a second modification of the present embodiment will be described with reference to FIGS. 17 to 21.

According to the second modification of the present embodiment, if a radio link failure (RLF) occurs on the sub PCC, one CC currently set as an SCC associated with the sub PCC is newly set as the sub PCC via a prescribed procedure. Consequently, for example, even if an RLF occurs on the sub PCC and the sub PCC becomes unusable, an SCC that was associated with the sub PCC may continue to be used. For this reason, communication quality may be improved, for example.

(Macro Base Station 100: Communication Control Unit 153)

(1-2) Setting Additional CC to be Used by Terminal Device

Setting Sub PCC

In the second modification of the present embodiment, if a radio link failure (RLF) occurs on the sub PCC, the communication control unit 153 newly sets one CC currently set as an SCC associated with the sub PCC as the sub PCC via a prescribed procedure. In other words, when an RLF occurs on the sub PCC, the communication control unit 153 changes the sub PCC.

The above prescribed procedure is, for example, the connection reconfiguration procedure for changing the sub PCC. Hereinafter, FIG. 17 will be referenced to describe a series of operations related to the occurrence of an RLF.

Figure 17:
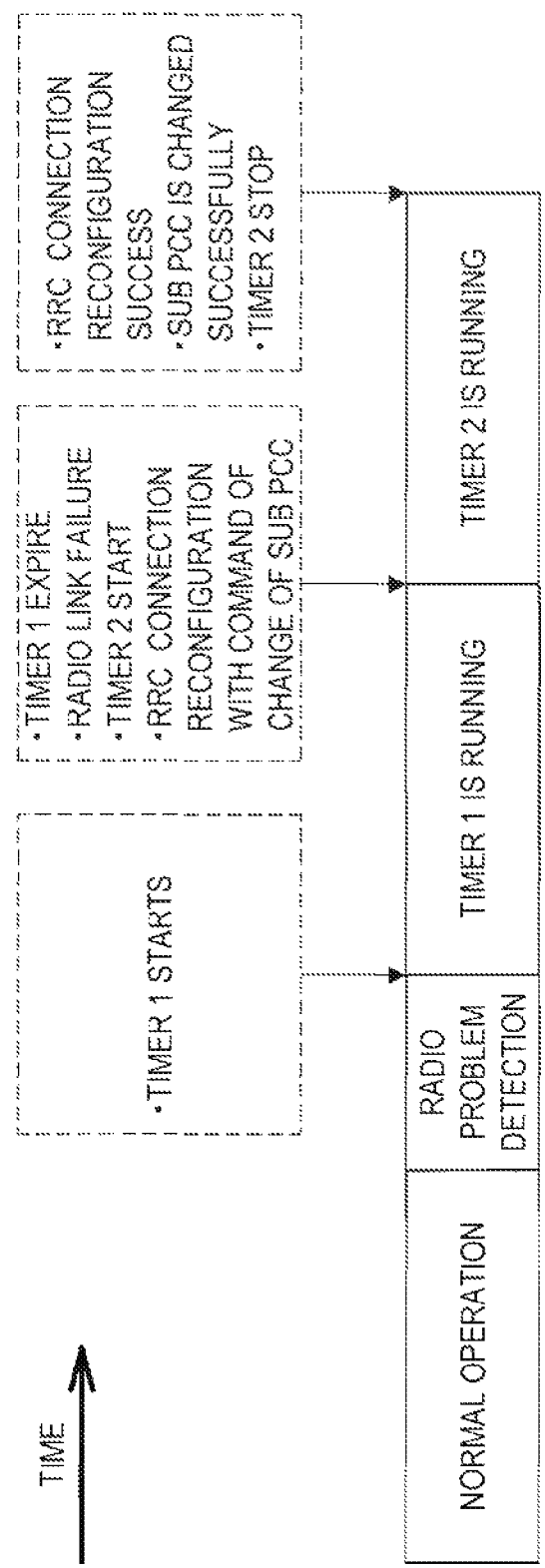
FIG. 17 is an explanatory diagram for illustrating a first example of a series of operations related to the occurrence of a radio link failure (RLF).

FIG. 17 is an explanatory diagram for illustrating a first example of a series of operations related to the occurrence of a radio link failure (RLF). Referring to FIG. 17, if the terminal device 300 detects a radio link problem (RLP) regarding the sub PCC after normal operation, a timer 1 is started. Subsequently, if the timer 1 expires, the terminal device 300 detects an RLF, and starts a timer T2. Also, the terminal device 300 notifies the macro base station 100 of the expiration of the timer 1 by RRC signaling. Subsequently, the macro base station 100 transmits an RRC Connection Reconfiguration message with a command for changing the sub PCC to the terminal device 300. Subsequently, in the example illustrated in FIG. 17, the connection reconfiguration procedure is successful, and the sub PCC is changed successfully. Also, the timer 2 stops.

Consequently, for example, even if an RLF occurs on the sub PCC and the sub PCC becomes unusable, an SCC that was associated with the sub PCC may continue to be used. For this reason, communication quality may be improved, for example.

On the other hand, for example, if the above prescribed procedure does not complete within a prescribed period, the communication control unit 153 stops usage of the sub PCC and the SCC associated with the sub PCC by the above terminal device. For example, the sub PCC and the SCC associated with the sub PCC are deactivated. Hereinafter, a specific example regarding this point will be described with reference to FIG. 18.

Figure 18:
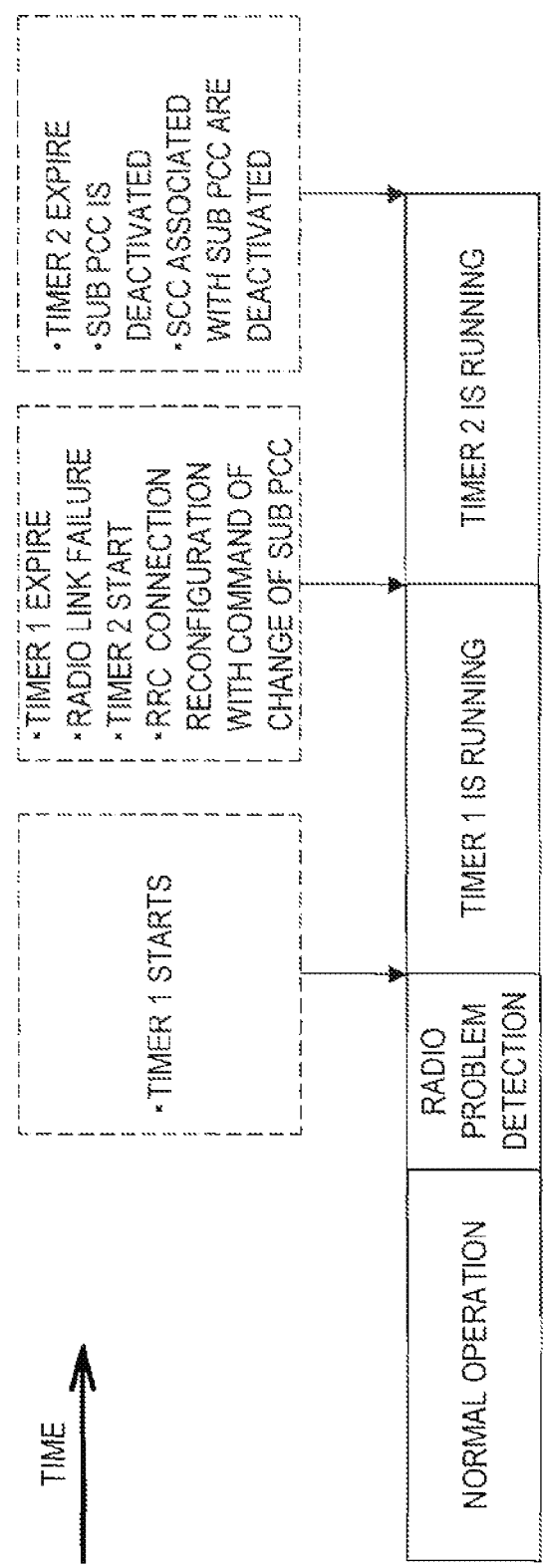
FIG. 18 is an explanatory diagram for illustrating a second example of a series of operations related to the occurrence of a radio link failure (RLF).

FIG. 18 is an explanatory diagram for illustrating a second example of a series of operations related to the occurrence of a radio link failure (RLF). In the example illustrated in FIG. 18, unlike the example illustrated in FIG. 17, the timer 2 expires before the RRC Connection Reconfiguration procedure succeeds. In this case, the communication control unit 153 deactivates the sub PCC and the SCC associated with the sub PCC.

Consequently, for example, even though communication on the sub PCC is difficult, continued usage of the sub PCC may be avoided. As another example, even though transmitting uplink control information for an SCC associated with the sub PCC (such as an ACK/NACK, a scheduling request, and periodically reported CSI) is difficult, continued usage of the above SCC may be avoided. As a result, wireless communications associated with degraded communication quality may be stopped rapidly.

Note that the above prescribed procedure may also be a connection re-establishment procedure for changing the sub PCC, for example. Hereinafter, specific examples regarding this point will be described with reference to FIGS. 19 and 20.

Figure 19:
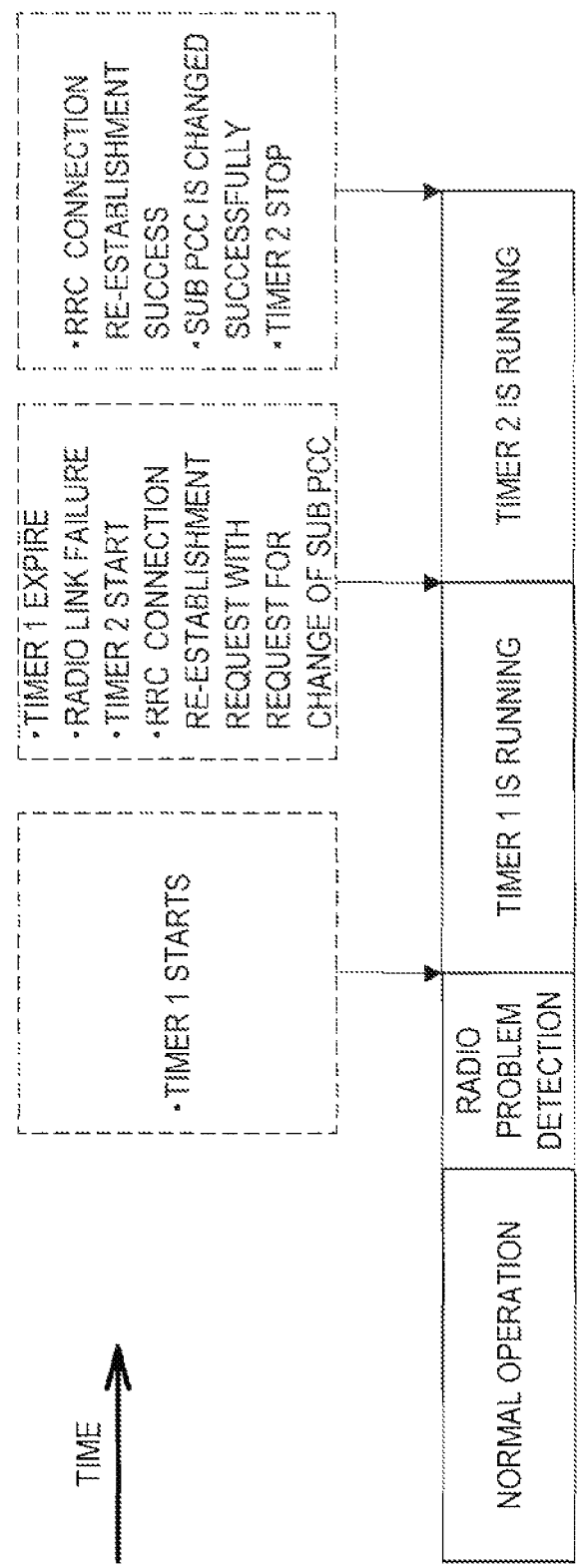
FIG. 19 is an explanatory diagram for illustrating a third example of a series of operations related to the occurrence of a radio link failure (RLF).

FIG. 19 is an explanatory diagram for illustrating a third example of a series of operations related to the occurrence of a radio link failure (RLF). Referring to FIG. 19, if the terminal device 300 detects a radio link problem (RLP) regarding the sub PCC after normal operation, a timer 1 is started. Subsequently, if the timer 1 expires, the terminal device 300 detects an RLF, and starts a timer T2. Also, the terminal device 300 transmits an RRC Connection Re-establishment Request with a request to change the sub PCC to the macro base station 100. Subsequently, in the example illustrated in FIG. 19, the connection re-establishment procedure is successful, and the sub PCC is changed successfully. Also, the timer 2 stops.

Figure 20:
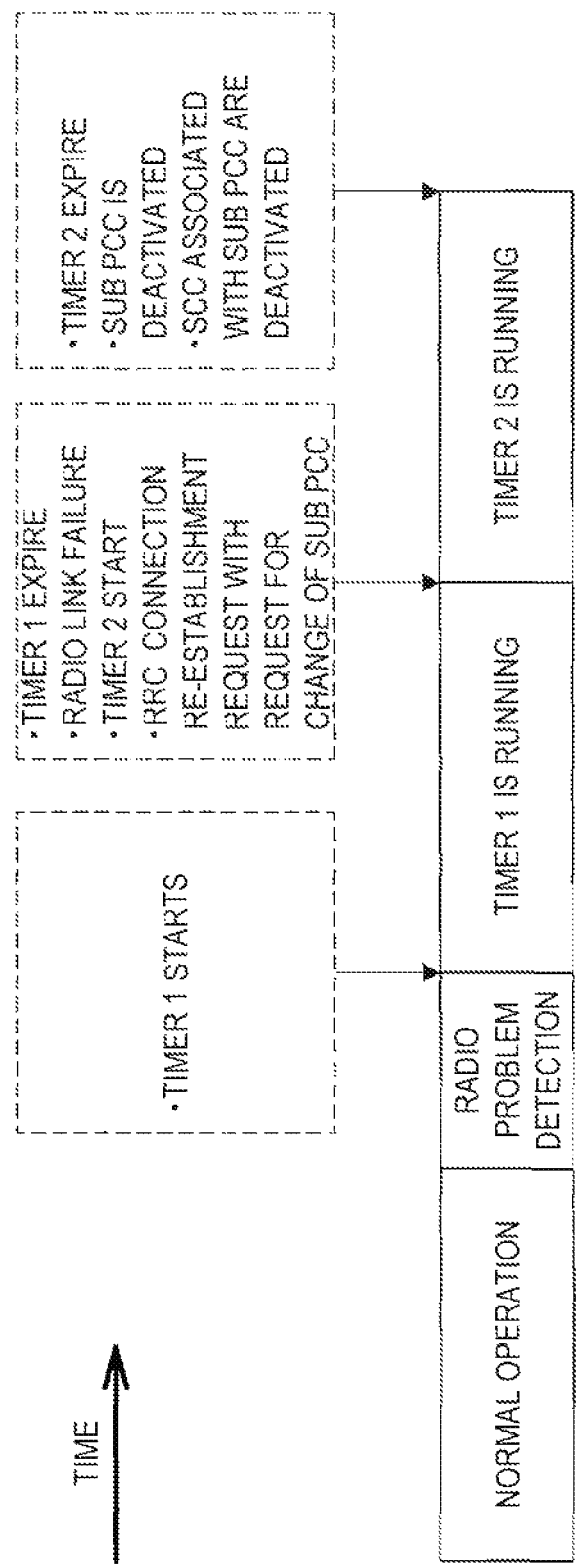
FIG. 20 is an explanatory diagram for illustrating a fourth example of a series of operations related to the occurrence of a radio link failure (RLF).

FIG. 20 is an explanatory diagram for illustrating a fourth example of a series of operations related to the occurrence of a radio link failure (RLF). In the example illustrated in FIG. 20, unlike the example illustrated in FIG. 19, the timer 2 expires before the RRC Connection Re-establishment procedure succeeds. In this case, the communication control unit 153 deactivates the sub PCC and the SCC associated with the sub PCC.

(Terminal Device 300: Communication Control Unit 363)

In the second embodiment of the present embodiment, the sub PCC is changed in response to the occurrence of an RLF as discussed above. In other words, one CC currently set as an SCC associated with the sub PCC is newly set as the sub PCC. In this case, the communication control unit 363 controls wireless communication on the above one CC newly set as the sub PCC so that uplink control information is transmitted on the uplink control channel of the above one CC.

Also, as described with reference to FIGS. 17 to 20, the terminal device 300 (for example, the communication control unit 363) may conduct operations such as detecting an RLP or an RLF on the sub PCC, controlling the timer 1 and the timer 2, and executing the above prescribed procedure (connection reconfiguration procedure or connection re-establishment procedure).

(Process Flow: Connection Reconfiguration Procedure)

The connection reconfiguration procedure according to the second modification of the present embodiment is the same as the connection reconfiguration procedure according to the first modification described with reference to FIG. 16, for example.

(Process Flow: Connection Re-Establishment Procedure)

Figure 21:
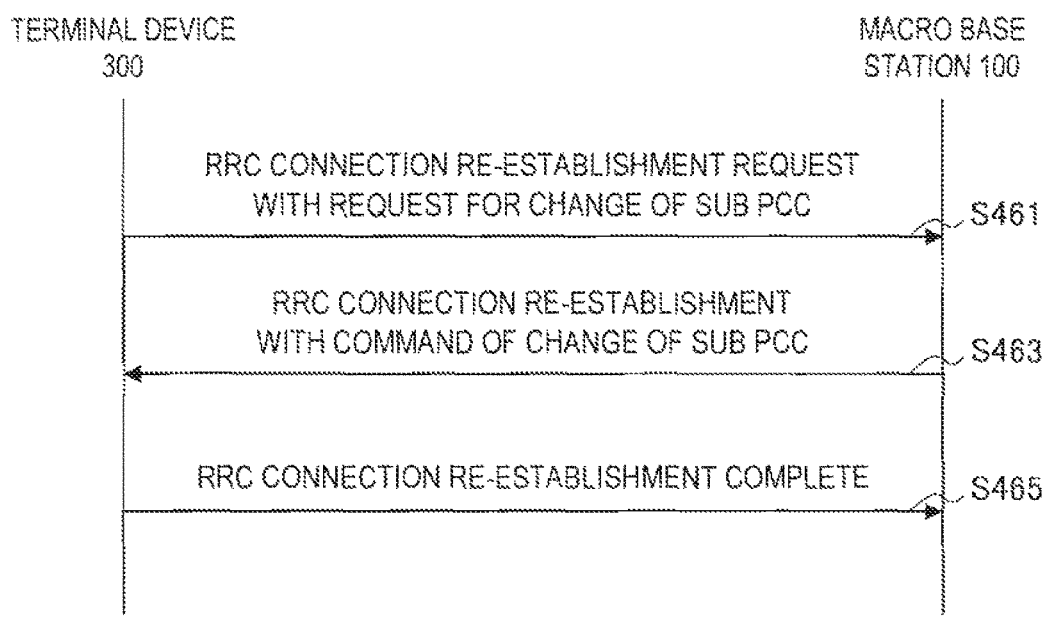
FIG. 21 is a flowchart illustrating an example of a diagrammatic flow of a connection re-establishment procedure according to a second modification of the embodiment.

FIG. 21 is a flowchart illustrating an example of a diagrammatic flow of a connection re-establishment procedure according to the second modification of the present embodiment. This procedure is conducted after an RLF is detected on the sub PCC, for example.

First, the terminal device 300 transmits, in the PCC for the terminal device 300 (a CC of the macro cell 10), an RRC Connection Re-establishment Request with a request to change the sub PCC to the macro base station 100 (S461).

Subsequently, the macro base station 100 transmits, in the PCC for the terminal device 300, an RRC Connection Re-establishment message with a command for changing the sub PCC to the terminal device 300 (S463).

Subsequently, the terminal device 300 transmits, in the PCC for the terminal device 300, an RRC Connection Re-establishment Complete message to the macro base station 100 (S465). The procedure then ends.

«7. Applications»

Technology according to the present disclosure is applicable to various products. For example, the macro base station 100 may be realized as an evolved Node B (eNB). Conversely, the macro base station 100 may also be realized as another type of base station, such as a NodeB or a base transceiver station (BTS). The macro base station 100 may also include a main unit that controls radio communication (also called a base station device), and one or more remote radio heads (RRHs) placed in a location separate from the main unit.

In addition, the terminal device 300 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the terminal device 300 may also be realized as a terminal that conducts machine-to-machine (M2M) communication (also called a machine-type communication (MTC) terminal). Furthermore, the terminal device 300 may be a radio communication module mounted onboard these terminals (for example, an integrated circuit module configured on a single die).

<7.1. Application Examples Regarding Base Station>
(First Application Example)

Figure 22:
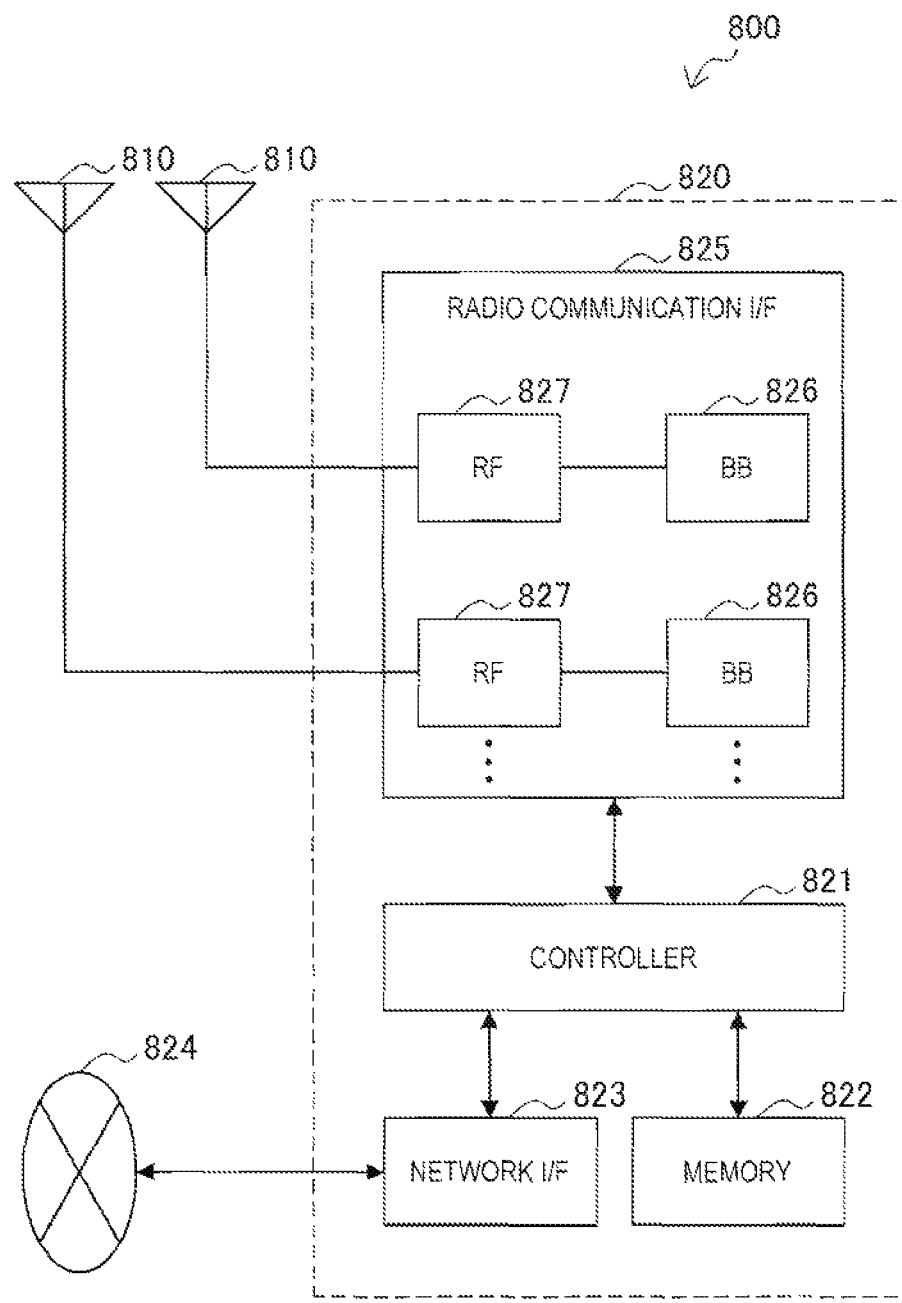
FIG. 22 is a block diagram illustrating a first example of a schematic configuration of an eNB according to an embodiment of the present disclosure may be applied.

FIG. 22 is a block diagram illustrating a first example of a schematic configuration of an eNB to which the technology of the present disclosure may be applied. An eNB 800 includes one or more antennas 810 and a base station apparatus 820. Each antenna 810 and the base station apparatus 820 may be connected to each other via an RF cable.

Each of the antennas 810 includes a single or multiple antenna elements (such as multiple antenna elements included in an MIMO antenna), and is used for the base station apparatus 820 to transmit and receive radio signals. The eNB 800 may include the multiple antennas 810, as illustrated in FIG. 22. For example, the multiple antennas 810 may be compatible with multiple frequency bands used by the eNB 800. Although FIG. 22 illustrates the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station apparatus 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 22. For example, the multiple BB processors 826 may be compatible with multiple frequency bands used by the eNB 800. The radio communication interface 825 may include the multiple RF circuits 827, as illustrated in FIG. 22. For example, the multiple RF circuits 827 may be compatible with multiple antenna elements. Although FIG. 22 illustrates the example in which the radio communication interface 825 includes the multiple BB processors 826 and the multiple RF circuits 827, the radio communication interface 825 may also include a single BB processor 826 or a single RF circuit 827.

(Second Application Example)

Figure 23:
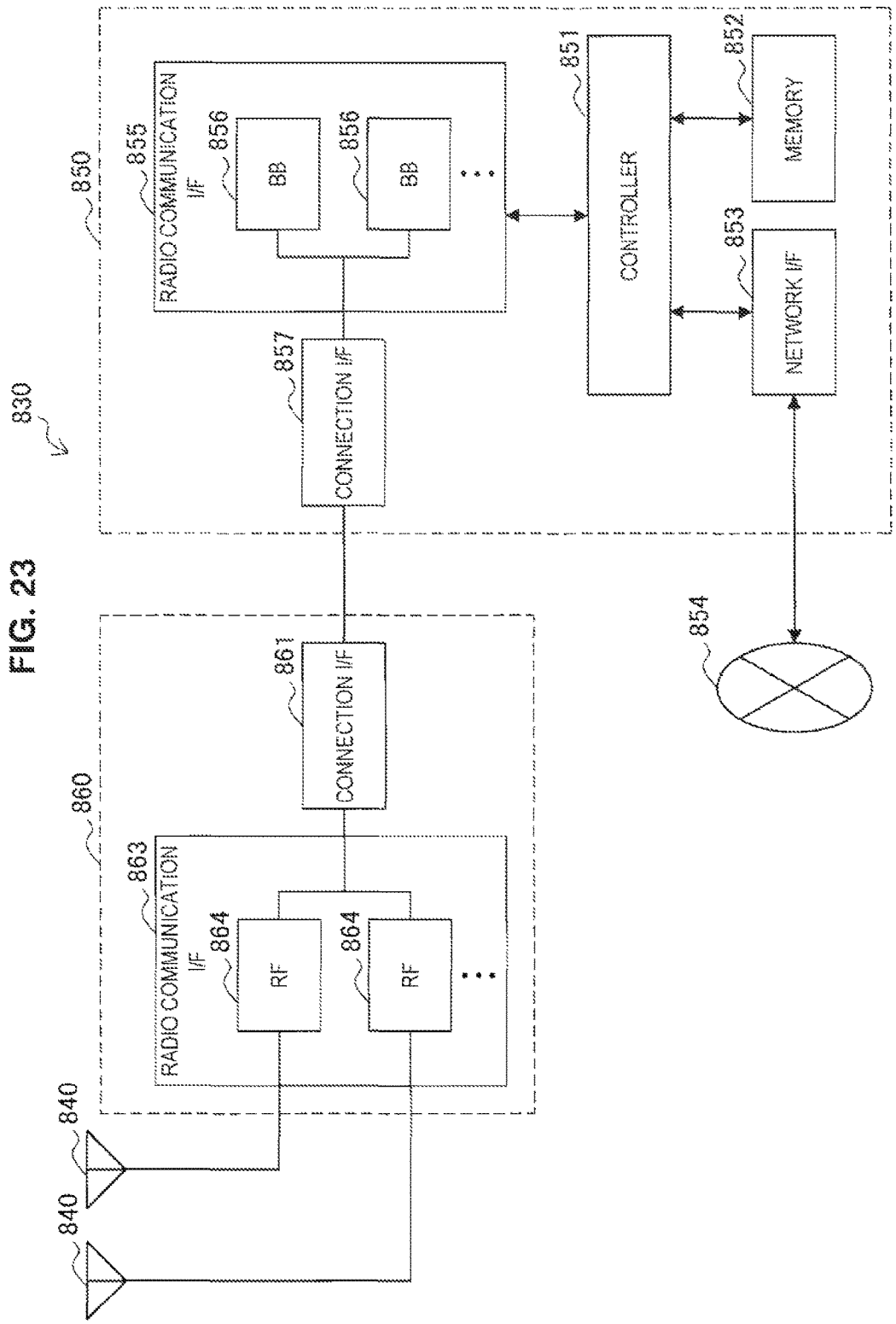
FIG. 23 is a block diagram illustrating a second example of a schematic configuration of an eNB according to an embodiment of the present disclosure may be applied.

FIG. 23 is a block diagram illustrating a second example of a schematic configuration of an eNB to which the technology of the present disclosure may be applied. An eNB 830 includes one or more antennas 840, a base station apparatus 850, and an RRH 860. Each antenna 840 and the RRH 860 may be connected to each other via an RF cable. The base station apparatus 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 23. For example, the multiple antennas 840 may be compatible with multiple frequency bands used by the eNB 830. Although FIG. 23 illustrates the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 22.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 22, except the BB processor 856 is connected to the RF circuit 864 of the RRH 860 via the connection interface 857. The radio communication interface 855 may include the multiple BB processors 856, as illustrated in FIG. 23. For example, the multiple BB processors 856 may be compatible with multiple frequency bands used by the eNB 830. Although FIG. 23 illustrates the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 23. For example, the multiple RF circuits 864 may support multiple antenna elements. Although FIG. 23 illustrates the example in which the radio communication interface 863 includes the multiple RF circuits 864, the radio communication interface 863 may also include a single RF circuit 864.

In the eNB 800 and the eNB 830 illustrated in FIGS. 22 and 23, the information acquisition unit 151 and the communication control unit 153 described by using FIG. 6 may be implemented by the radio communication interface 825, and the radio communication interface 855 and/or the radio communication interface 863. At least a part of the functions may also be implemented by the controller 821 and the controller 851.

<7.2. Application Examples Regarding Terminal Apparatus>

(First Application Example)

Figure 24:
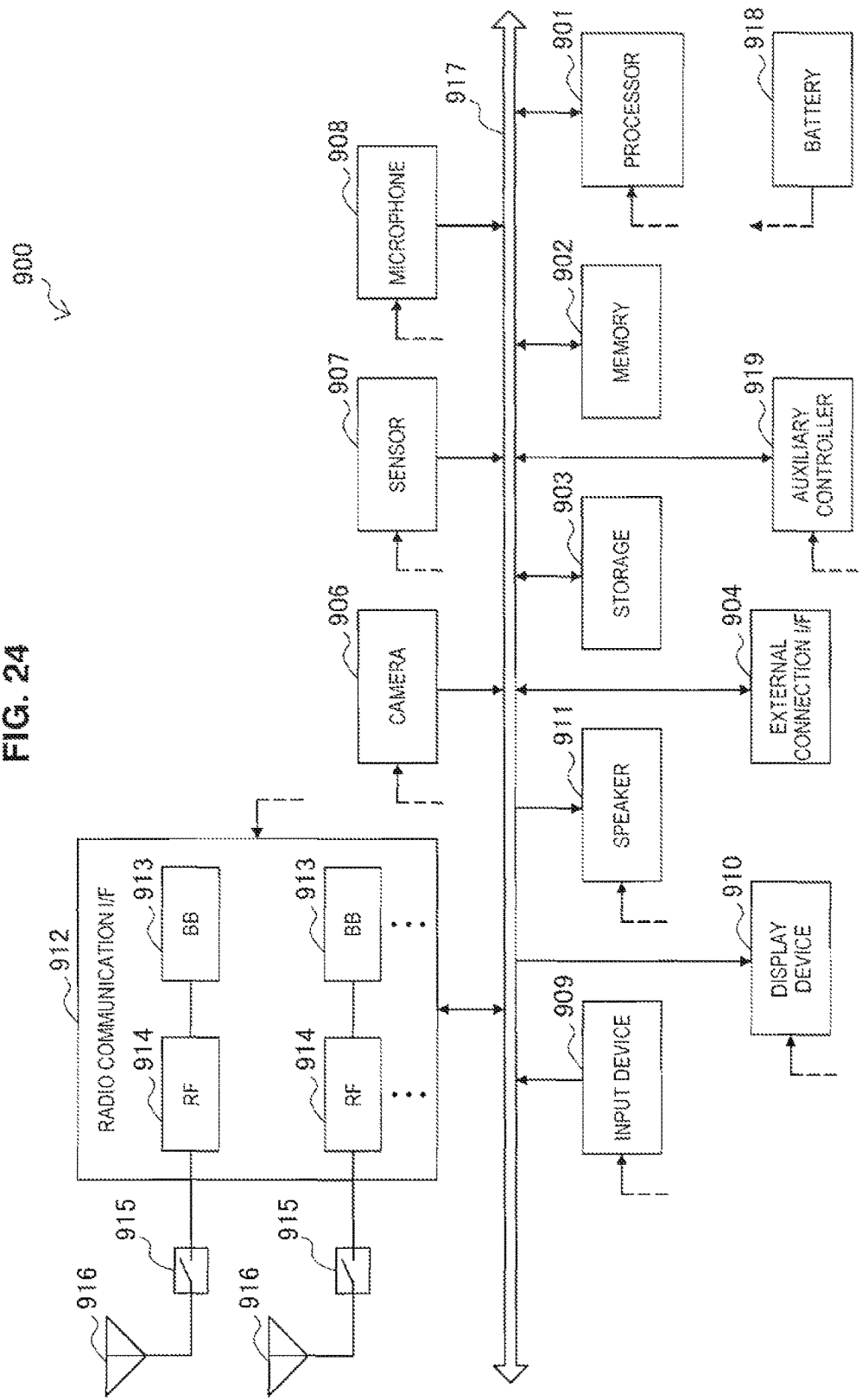
FIG. 24 is a block diagram illustrating an example of a schematic configuration of a smartphone according to an embodiment of the present disclosure may be applied.

FIG. 24 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 934 and the multiple RF circuits 914, as illustrated in FIG. 24. Although FIG. 24 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 24. Although FIG. 24 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 24 via feeder lines, which are partially shown as dashed lines in the figure. The auxiliary controller 919 operates a minimum necessary function of the smartphone 900, for example, in a sleep mode.

In the smartphone 900 illustrated in FIG. 24, the information acquisition unit 361 and the communication control unit 363 described by using FIG. 10 may be implemented by the radio communication interface 912. At least a part of the functions may also be implemented by the processor 901 or the auxiliary controller 919.

(Second Application Example)

Figure 25:
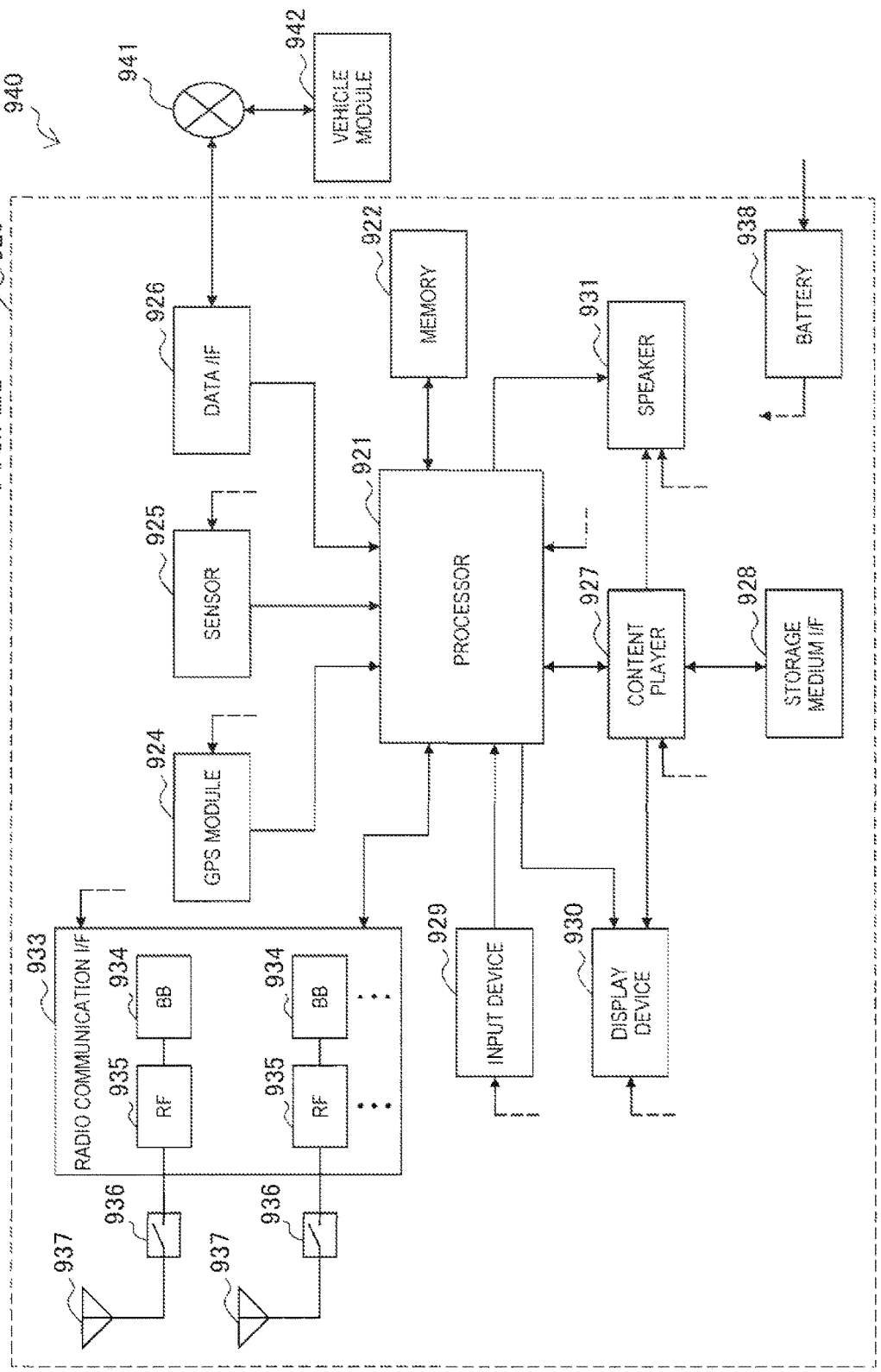
FIG. 25 is a block diagram illustrating an example of a schematic configuration of a car navigation apparatus according to an embodiment of the present disclosure may be applied.

FIG. 25 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation apparatus 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation apparatus 920. The sensor 925 may include a group of sensors such as a gyro sensor, a geomagnetic sensor, and an air pressure sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 25. Although FIG. 25 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation apparatus 920 may include the multiple antennas 937, as illustrated in FIG. 25. Although FIG. 25 illustrates the example in which the car navigation apparatus 920 includes the multiple antennas 937, the car navigation apparatus 920 may also include a single antenna 937.

Furthermore, the car navigation apparatus 920 may include the antenna 937 for each radio communication scheme. In that case, the antenna switches 936 may be omitted from the configuration of the car navigation apparatus 920.

The battery 938 supplies power to blocks of the car navigation apparatus 920 illustrated in FIG. 25 via feeder lines that are partially shown as dashed lines in the figure. The battery 938 accumulates power supplied form the vehicle.

In the car navigation apparatus 920 illustrated in FIG. 25, the information acquisition unit 361 and the communication control unit 363 described by using FIG. 10 may be implemented by the radio communication interface 933. At least a part of the functions may also be implemented by the processor 921.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

«8. Conclusion»

The foregoing thus describes an embodiment of the present disclosure with reference to FIGS. 5 to 25. According to an embodiment of the present disclosure, the macro base station 100 is equipped with an information acquisition unit 151 that acquires information about a terminal device using one CC of a macro cell 10 as the PCC, and a communication control unit 153 that sets one or more CCs of a small cell 20 as additional CCs to be used additionally by the terminal device. The communication control unit 153 sets one CC among the above one or more CCs as the sub PCC (that is, a special CC on which the above terminal device is able to transmit uplink control information on an uplink control channel).

Consequently, for example, it becomes possible to reduce the effect of backhauling on wireless communications in the case of carrier aggregation.

More specifically, ordinarily uplink control information on an uplink control channel is not transmitted by an SCC, and instead, uplink control information for an SCC is transmitted on an uplink control channel of the PCC. For this reason, if the SCC is a CC of the small cell 20 and the PCC is a CC of the macro cell 10, a delay on the backhaul may cause uplink control information for an SCC to take a long time to reach the small base station 200. Accordingly, as discussed above, one CC of the small cell 20 is set as the sub PCC. Uplink control information is then transmitted on the uplink control channel of the sub PCC. Consequently, the effect of backhauling on wireless communications is reduced, for example.

Uplink Control Information

For example, the above uplink control information includes an acknowledgement (ACK) and a negative acknowledgement (NACK) regarding the reception of a downlink signal.

Consequently, for example, since an ACK/NACK is transmitted on the uplink control channel of the sub PCC, the ACK/NACK reaches the small base station 200 quickly. Consequently, suitable retransmission control may be possible.

Additionally, the above uplink control information includes a scheduling request (SR), for example.

Consequently, for example, since a scheduling request is transmitted on the uplink control channel (PUCCH) of the sub PCC, the scheduling request reaches the small base station 200 quickly. Consequently, rapid scheduling may be possible.

Additionally, the above uplink control information includes periodically reported channel state information (CSI), for example.

Consequently, for example, since periodically reported CSI is transmitted on the uplink control channel (PUCCH) of the sub PCC, the CSI reaches the small base station 200 quickly. Consequently, rapid adaptation of the wireless communications of the above terminal device to the environment may be possible.

Uplink Control Channel

The above uplink control channel is the PUCCH, for example.

Consequently, for example, since uplink control information transmitted on the PUCCH is transmitted on the PUCCH of the sub PCC, the relevant uplink control signal may reach the small base station 200 quickly.

Notification of Addition of Sub PCC

When newly setting a CC of the small cell 20 as an additional CC to be used by a terminal device, if the relevant CC is set as the sub PCC, the communication control unit 153 notifies the above terminal device that the relevant CC is added as the sub PCC.

Consequently, for example, a terminal device using a CC of the macro cell 10 as the PCC becomes able to learn which CC is the sub PCC for the relevant terminal device. For this reason, the relevant terminal device becomes able to actually transmit uplink control information on the uplink control channel of the sub PCC. Note that since the terminal device conducts procedures such as the Connection Establishment procedure on the PCC, the PCC is self-evident to the terminal device, but since the terminal device does not conduct procedures such as the Connection Establishment procedure on the sub PCC, the sub PCC is not self-evident to the terminal device. For this reason, a notification like the above is particularly effective.

Setting SCC Associated with Sub PCC

For example, the communication control unit 153 sets a CC not set as the sub PCC from among the above one or more CCs of the small cell 20 (that is, the one or more CCs set as the above additional CCs) as an SCC associated with the sub PCC. An SCC associated with the sub PCC is a CC by which a terminal device is unable to transmit the above uplink control information on the above uplink control channel. The above uplink control information for an SCC associated with the sub PCC is transmitted on the above uplink control channel of the sub PCC.

Consequently, for example, not only uplink control information for the sub PCC but also uplink control information for an SCC associated with the sub PCC may be transmitted on the uplink control channel of the sub PCC. Consequently, the effect of backhauling on wireless communications may be reduced further, for example.

Notification of Addition of SCC Associated with Sub PCC

For example, when newly setting a CC of the small cell 20 as an additional CC to be used by a terminal device, if the relevant CC is set as an SCC associated with the sub PCC, the communication control unit 153 notifies the above terminal device that the relevant CC is added as an SCC associated with the sub PCC.

Accordingly, for example, a terminal device using a CC of the macro cell 10 as the PCC becomes able to learn which CC is an SCC associated with the sub PCC. For this reason, the relevant terminal device becomes able to actually transmit uplink control information for the relevant SCC on the uplink control channel of the sub PCC.

Setting (Changing) Sub PCC

According to the first modification of the present embodiment, the communication control unit 153 changes the sub PCC by newly setting, as the sub PCC, one CC currently set as an SCC associated with the sub PCC.

Consequently, for example, changing the sub PCC does not require a complicated procedure like a handover, unlike changing the PCC. For this reason, the sub PCC may be changed with a reduced burden, for example.

Association with Sub PCC after Change of Sub PCC

According to the first modification of the present embodiment, for example, after the change of the sub PCC, another CC set as an SCC associated with the sub PCC is associated with the above one CC newly set as the sub PCC.

Consequently, for example, even if the sub PCC is changed, an SCC associated with the sub PCC is not released, removed, or deactivated, but instead continues to be used. For this reason, re-adding a CC is not necessary, and thus the burden may be reduced. In other words, the sub PCC may be changed with a reduced burden.

Notification of Change of Sub PCC

According to the first modification of the present embodiment, for example, during the change of the sub PCC, the communication control unit 153 notifies the above terminal device that the sub PCC is changed to the above one CC newly set as the sub PCC.

Accordingly, for example, a terminal device using a CC of the macro cell 10 as the PCC becomes able to learn of the change of the sub PCC. For this reason, the relevant terminal device becomes able to actually transmit uplink control information on the uplink control channel of the sub PCC after the change of the sub PCC.

Setting (Changing) Sub PCC

According to the second modification of the present embodiment, for example, if a radio link failure (RLF) occurs on the sub PCC, the communication control unit 153 newly sets one CC currently set as an SCC associated with the sub PCC as the sub PCC via a prescribed procedure.

Consequently, for example, even if an RLF occurs on the sub PCC and the sub PCC becomes unusable, an SCC that was associated with the sub PCC may continue to be used. For this reason, communication quality may be improved, for example.

On the other hand, for example, if the above prescribed procedure does not complete within a prescribed period, the communication control unit 153 stops usage of the sub PCC and the SCC associated with the sub PCC by the above terminal device.

Consequently, for example, even though communication on the sub PCC is difficult, continued usage of the sub PCC may be avoided. As another example, even though transmitting uplink control information for an SCC associated with the sub PCC (such as an ACK/NACK, a scheduling request, and periodically reported CSI) is difficult, continued usage of the above SCC may be avoided. As a result, wireless communications associated with degraded communication quality may be stopped rapidly.

Conditions of Setting

Also, for example, if the backhaul between the macro base station 100 and the small base station 200 does not satisfy a prescribed quality standard, the communication control unit 153 sets the above one CC among the above one or more CCs of the small cell 20 as the sub PCC.

Consequently, it becomes possible to set the sub PCC in cases where the delay on the backhaul may become large, for example.

Also, if the backhaul between the macro base station 100 and the small base station 200 satisfies a prescribed quality standard, the communication control unit 153 sets each of the above one or more CCs of the small cell 20 as an SCC associated with the PCC.

Consequently, for example, if a small delay on the backhaul is anticipated, it becomes possible to treat the CCs of the small cell as SCCs associated with the PCC. For this reason, the small base station 200 may be dedicated to transmitting and receiving data, for example. As a result, throughput in the small cell 20 may be improved.

The preferred embodiment(s) of the present disclosure has/have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, an example is described in which a CC (for example, the sub PCC) is set by updating the setting information indicating a CC to be used by a terminal device, but the present disclosure is not limited to such an example. For example, the above setting information may also be other information about a CC to be used by a terminal device, and not information indicating a CC to be used by a terminal device. Also, a CC (for example, the sub PCC) may be set by a method other than updating setting information. In other words, a CC may be set by some other method enabling a CC to be used.

In addition, an example is described in which the sub PCC is set if the backhaul between the macro cell and the small cell does not satisfy the prescribed quality standard, and the sub PCC is not set otherwise, but the present disclosure is not limited to such an example. For example, one CC of the small cell may also be set as the sub PCC, irrespectively of the above backhaul.

In addition, an example is described in which, if a CC of the macro cell is the PCC and a CC of the small cell is the sub PCC, another CC of the relevant small cell is set as an SCC associated with the sub PCC, but the present disclosure is not limited to such an example. For example, the above other CC may also be set as an SCC associated with the PCC. As another example, a first CC of the above small cell may be set as an SCC associated with the PCC, while a second CC of the above small cell may be set as an SCC associated with the sub PCC.

In addition, an example in which a CC of the macro cell becomes the PCC is primarily described, but the present disclosure is not limited to such an example. For example, a CC of the small cell may also become the PCC. In this case, none of the CCs of the relevant small cell needs to be set as the sub PCC.

In addition, an example is described in which the terminal device uses the CCs of one small cell, but the present disclosure is not limited to such an example. For example, the terminal device may also use the CCs of multiple small cells simultaneously. In this case, a sub PCC may be set for each of the multiple small cells, or a common sub PCC may be set for two or more small cells among the multiple small cells.

In addition, an example is described in which the macro base station performs the acquisition of information about the terminal device using one CC of the macro cell as the PCC and the setting of the sub PCC, but the present disclosure is not limited to such an example. For example, any core network node may perform the above acquisition and the above setting. Alternatively, the small base station may perform the above acquisition and the above setting. In other words, the information acquisition unit and the communication control unit of the macro base station discussed earlier may also be provided by a core network node or the small base station instead of being provided by the macro base station.

Although an example is described in which the communication system is a system conforming to LTE, LTE-Advanced, or a compliant communication scheme, the present disclosure is not limited to such an example. For example, the communication system may be a system conforming to another communication standard.

Also, the processing steps in each process in this specification are not strictly limited to being executed in a time series following the sequence described in a flowchart. For example, the processing steps in each process may be executed in a sequence that differs from a sequence described herein as a flowchart, and furthermore may be executed in parallel.

In addition, it is possible to create a computer program for causing hardware such as a CPU, ROM, and RAM built into a device according to an embodiment of the present disclosure (a communication control device or a terminal device) to exhibit functions similar to each structural element of the foregoing devices. Also, a storage medium having such a computer program stored therein may also be provided.

Also, an information processing device (for example, a processing circuit or chip) equipped with memory storing such a computer program (for example, ROM and RAM) and one or more processors capable of executing such a computer program (such as a CPU or DSP, for example) may also be provided.

In addition, the advantageous effects described in this specification are merely for the sake of explanation or illustration, and are not limiting. In other words, instead of or in addition to the above advantageous effects, technology according to the present disclosure may exhibit other advantageous effects that are clear to persons skilled in the art from the description of this specification.

Additionally, the present technology may also be configured as below.

(1)

A communication control device including:

an acquisition unit configured to acquire information about a terminal device that uses one component carrier of a macro cell as a primary component carrier; and a control unit configured to set one or more component carriers of a small cell partially or fully overlapping with the macro cell as an additional component carrier to be used additionally by the terminal device, wherein the control unit sets one component carrier among the one or more component carriers as a special component carrier on which the terminal device is able to transmit uplink control information on an uplink control channel.

(2)

The communication control device according to (1), wherein the uplink control information includes an acknowledgement (ACK) and a negative acknowledgement (NACK) regarding reception of a downlink signal.

(3)

The communication control device according to (1) or (2), wherein the uplink control information includes an uplink scheduling request.

(4)

The communication control device according to any one of (1) to (3), wherein the uplink control information includes periodically reported channel state information.

(5)

The communication control device according to any one of (1) to (4), wherein the uplink control channel is a physical uplink control channel (PUCCH).

(6)

The communication control device according to any one of (1) to (5), wherein the special component carrier is a component carrier on which a connection establishment procedure is not conducted by the terminal device.

(7)

The communication control device according to any one of (1) to (6), wherein the special component carrier is a component carrier selected for each terminal device.

(8)

The communication control device according to any one of (1) to (7), wherein when newly setting a component carrier of the small cell as the additional component carrier, if the control unit sets the relevant component carrier as the special component carrier, the control unit notifies the terminal device of the addition of the component carrier as the special component carrier.

(9)

The communication control device according to any one of (1) to (8), wherein the control unit sets a component carrier not set as the special component carrier from among the one or more component carriers of the small cell as a secondary component carrier associated with the special component carrier, the secondary component carrier is a component carrier on which the terminal device is unable to transmit the uplink control information on the uplink control channel, and the uplink control information related to the secondary component carrier is information transmitted on the uplink control channel of the special component carrier.

(10)

The communication control device according to (9), wherein when newly setting a component carrier of the small cell as the additional component carrier, if the control unit sets the relevant component carrier as the secondary component carrier, the control unit notifies the terminal device of the addition of the component carrier as the secondary component carrier.

(11)

The communication control device according to (9) or (10), wherein the control unit changes the special component carrier by newly setting, as the special component carrier, one component carrier currently set as the secondary component carrier.

(12)

The communication control device according to (11), wherein after the special component carrier is changed, another component carrier currently set as the secondary component carrier is associated with the one component carrier newly set as the special component carrier.

(13)

The communication control device according to (11) or (12), wherein when changing the special component carrier, the control unit notifies the terminal device that the special component carrier is changed to the one component carrier newly set as the special component carrier.

(14)

The communication control device according to (13), wherein the control unit notifies the terminal device that the special component carrier is changed to the one component carrier newly set as the special component carrier in a message during a connection reconfiguration procedure.

(15)

The communication control device according to any one of (11) to (14), wherein if a radio link failure occurs on the special component carrier, the control unit newly sets, as the special component carrier, one component carrier currently set as the secondary component carrier, via a prescribed procedure.

(16)

The communication control device according to (15), wherein the prescribed procedure is a connection reconfiguration procedure or a connection re-establishment procedure for changing the special component carrier.

(17)

The communication control device according to (15) or (16), wherein if the prescribed procedure does not complete within a prescribed period, the control unit stops usage of the special component carrier and the secondary component carrier associated with the special component carrier by the terminal device.

(18)

The communication control device according to any one of (11) to (17), wherein if a backhaul between a base station of the macro cell and a base station of the small cell does not satisfy a prescribed quality standard, the control unit sets the one component carrier among the one or more component carriers as the special component carrier, whereas if the backhaul satisfies the prescribed quality standard, the control unit sets each of the one or more component carriers as a secondary component carrier associated with the primary component carrier.

(19)

A communication control method including:

acquiring information about a terminal device that uses one component carrier of a macro cell as a primary component carrier; and setting, by a processor, one or more component carriers of a small cell partially or fully overlapping with the macro cell as an additional component carrier to be used additionally by the terminal device, wherein the setting of the one or more component carriers as the additional component carrier includes setting one component carrier among the one or more component carriers as a special component carrier on which the terminal device is able to transmit uplink control information on an uplink control channel.

(20)

A terminal device including:

an acquisition unit configured to acquire, when the terminal device uses one component carrier of a macro cell as a primary component carrier, one or more component carriers of a small cell partially or fully overlapping with the macro cell are set as an additional component carrier to be used additionally by the terminal device, and one component carrier among the one or more component carriers is set as a special component carrier on which the terminal device is able to transmit uplink control information on an uplink control channel, information about the one component carrier; and a control unit configured to control wireless communication on the one component carrier so that the uplink control information is transmitted on the uplink control channel of the one component carrier.

REFERENCE SIGNS LIST 1 communication system
10 macro cell
20 small cell
100 macro base station
151 information acquisition unit
153 communication control unit
200 small base station
300 terminal device
361 information acquisition unit
363 communication control unit

The invention claimed is:

1. A communication control device comprising:
processing circuitry configured to:
acquire information about a terminal device that uses one component carrier of a macro cell as a primary component carrier that notifies the terminal device via the primary component carrier when a special component carrier is changed to a different special component carrier,
set one or more component carriers of a small cell partially or fully overlapping with the macro cell as an additional component carrier to be used additionally by the terminal device, and
set one component carrier among the one or more component carriers as the special component carrier on which the terminal device is able to transmit uplink control information on an uplink control channel, although the special component carrier of the small cell is not used to conduct connection establishment with the terminal device,
wherein the uplink control information includes at least one of an acknowledgement (ACK) and a negative acknowledgement (NACK) regarding reception of a downlink signal, an uplink scheduling request, or periodically reported channel state information, wherein
the processing circuitry sets a component carrier not set as the special component carrier from among the one or more component carriers of the small cell as a secondary component carrier associated with the special component carrier,
the secondary component carrier is a component carrier on which the terminal device is unable to transmit the uplink control information on the uplink control channel, and
the uplink control information related to the secondary component carrier is information transmitted on the uplink control channel of the special component carrier.

2. The communication control device according to claim 1, wherein the uplink control channel is a physical uplink control channel (PUCCH).

3. The communication control device according to claim 1, wherein the special component carrier is a component carrier selected for each terminal device.

4. The communication control device according to claim 1, wherein when newly setting a component carrier of the small cell as the additional component carrier, when the processing circuitry sets the relevant component carrier as the special component carrier, the processing circuitry notifies the terminal device of the addition of the component carrier as the special component carrier.

5. The communication control device according to claim 1, wherein when newly setting a component carrier of the small cell as the additional component carrier, when the processing circuitry sets the relevant component carrier as the secondary component carrier, the processing circuitry notifies the terminal device of the addition of the component carrier as the secondary component carrier.

6. The communication control device according to claim 1, wherein the processing circuitry changes the special component carrier by newly setting, as the special component carrier, one component carrier currently set as the secondary component carrier.

7. The communication control device according to claim 6, wherein after the special component carrier is changed, another component carrier currently set as the secondary component carrier is associated with the one component carrier newly set as the special component carrier.

8. The communication control device according to claim 6, wherein when changing the special component carrier, the processing circuitry notifies the terminal device that the special component carrier is changed to the one component carrier newly set as the special component carrier.

9. The communication control device according to claim 8, wherein the processing circuitry notifies the terminal device that the special component carrier is changed to the one component carrier newly set as the special component carrier in a message during a connection reconfiguration procedure.

10. The communication control device according to claim 6, wherein when a radio link failure occurs on the special component carrier, the processing circuitry newly sets, as the special component carrier, one component carrier currently set as the secondary component carrier, via a prescribed procedure.

11. The communication control device according to claim 10, wherein the prescribed procedure is a connection reconfiguration procedure or a connection re-establishment procedure for changing the special component carrier.

12. The communication control device according to claim 10, wherein when the prescribed procedure does not complete within a prescribed period, the processing circuitry stops usage of the special component carrier and the secondary component carrier associated with the special component carrier by the terminal device.

13. The communication control device according to claim 1, wherein when a backhaul between a base station of the macro cell and a base station of the small cell does not satisfy a prescribed quality standard, the processing circuitry sets the one component carrier among the one or more component carriers as the special component carrier, whereas when the backhaul satisfies the prescribed quality standard, the processing circuitry sets each of the one or more component carriers as a secondary component carrier associated with the primary component carrier.

14. A communication control method comprising:
acquiring information about a terminal device that uses one component carrier of a macro cell as a primary component carrier;
setting, by a processor, one or more component carriers of a small cell partially or fully overlapping with the macro cell as an additional component carrier to be used additionally by the terminal device; and
setting, by the processor, one component carrier among the one or more component carriers as a special component carrier on which the terminal device is able to transmit uplink control information on an uplink control channel, although the special component carrier of the small cell is not used to conduct connection establishment with the terminal device,
notifying the terminal device via the primary component carrier when the special component carrier is changed to a different special component carrier, wherein
the uplink control information includes at least one of an acknowledgement (ACK) and a negative acknowledgement (NACK) regarding reception of a downlink signal, an uplink scheduling request, or periodically reported channel state information, wherein
the setting includes setting a component carrier not set as the special component carrier from among the one or more component carriers of the small cell as a secondary component carrier associated with the special component carrier,
the secondary component carrier is a component carrier on which the terminal device is unable to transmit the uplink control information on the uplink control channel, and
the uplink control information related to the secondary component carrier is information transmitted on the uplink control channel of the special component carrier.

* * * * *